(12) United States Patent
Schmitt

(10) Patent No.: US 6,453,500 B1
(45) Date of Patent: Sep. 24, 2002

(54) VEHICLE ROOF SNOW REMOVAL SYSTEM

(76) Inventor: Frank Schmitt, 126 Ellwood Dr. East, Bolton, Ontario (CA), L7E 2A4

( * ) Notice: Subject to any disclaimer, the term of this patent is extended or adjusted under 35 U.S.C. 154(b) by 0 days.

(21) Appl. No.: 09/732,554

(22) Filed: Dec. 8, 2000

(51) Int. Cl.[7] .................................................. B60S 3/04
(52) U.S. Cl. ..................................... 15/97.3; 15/DIG. 2
(58) Field of Search .................. 15/53.1, 53.2, 15/53.3, 97.3, DIG. 2

(56) References Cited

U.S. PATENT DOCUMENTS

| | | | |
|---|---|---|---|
| 1,864,821 A | | 6/1932 | Heuze |
| 3,104,406 A | | 9/1963 | Rhodes |
| 3,601,832 A | * | 8/1971 | Cook |
| 3,908,289 A | | 9/1975 | Ross |
| 4,949,423 A | | 8/1990 | Larson et al. |
| 5,093,951 A | | 3/1992 | Smith et al. |
| 5,802,654 A | | 9/1998 | Yeaglin |
| 5,989,356 A | * | 11/1999 | Candeletti |

* cited by examiner

Primary Examiner—Terrence R. Till

(57) ABSTRACT

A vehicle roof snow removal system for removing snow and ice from the top of a vehicle. The vehicle root snow removal system includes a main frame. A scraper blade assembly is coupled to the main frame. The scraper blade assembly comprises a scraper blade. The scraper blade is lowerable from a top of said main frame.

33 Claims, 22 Drawing Sheets

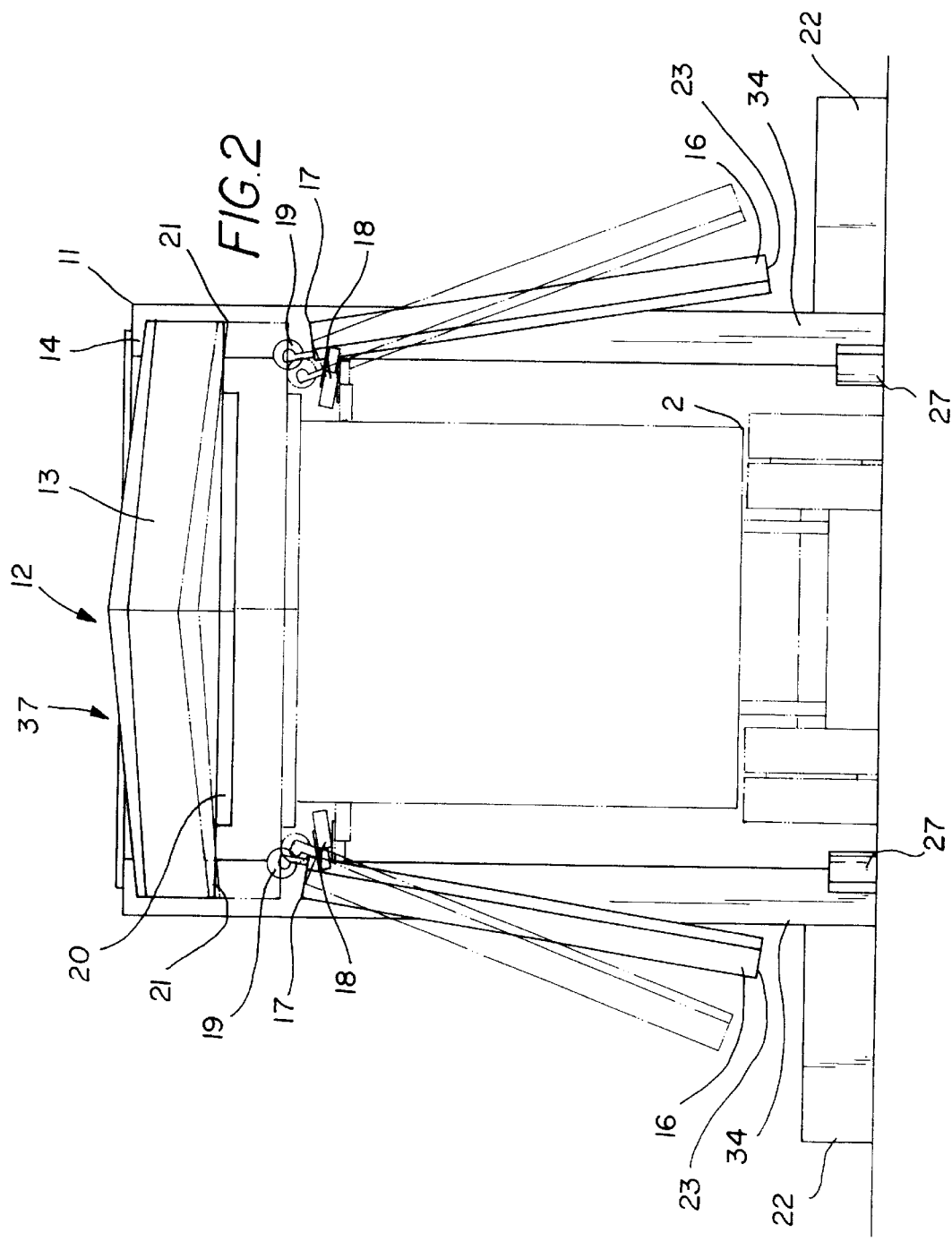

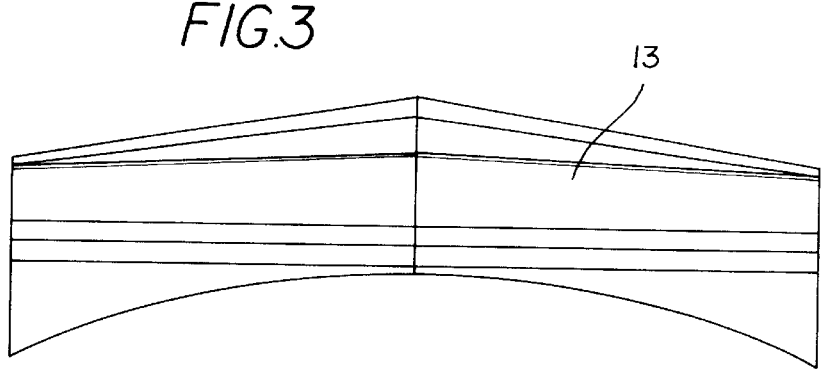
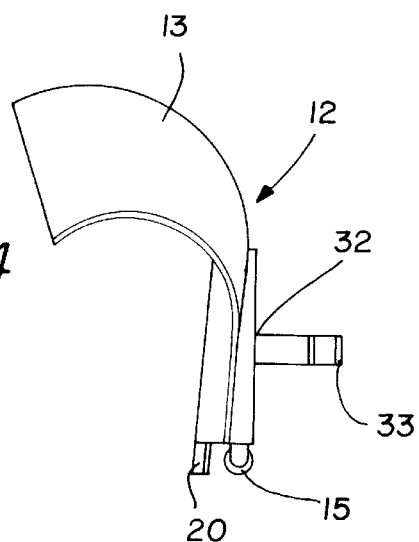
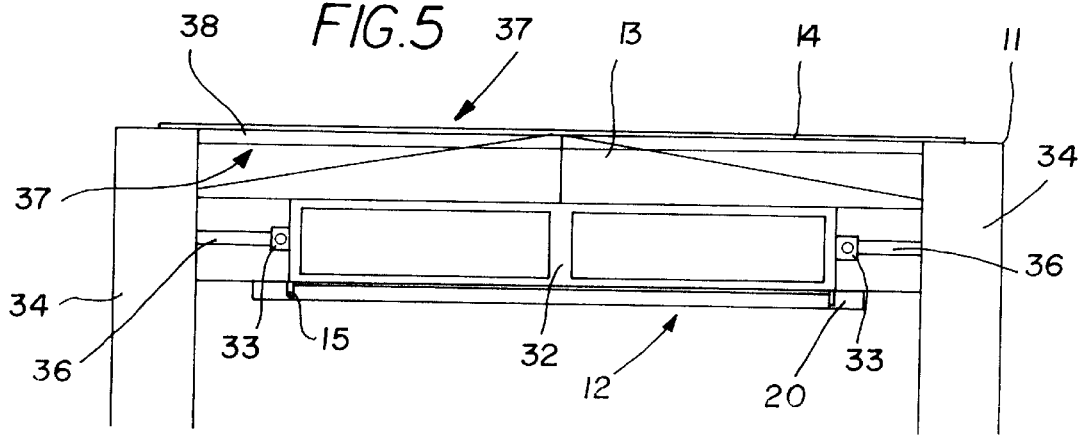

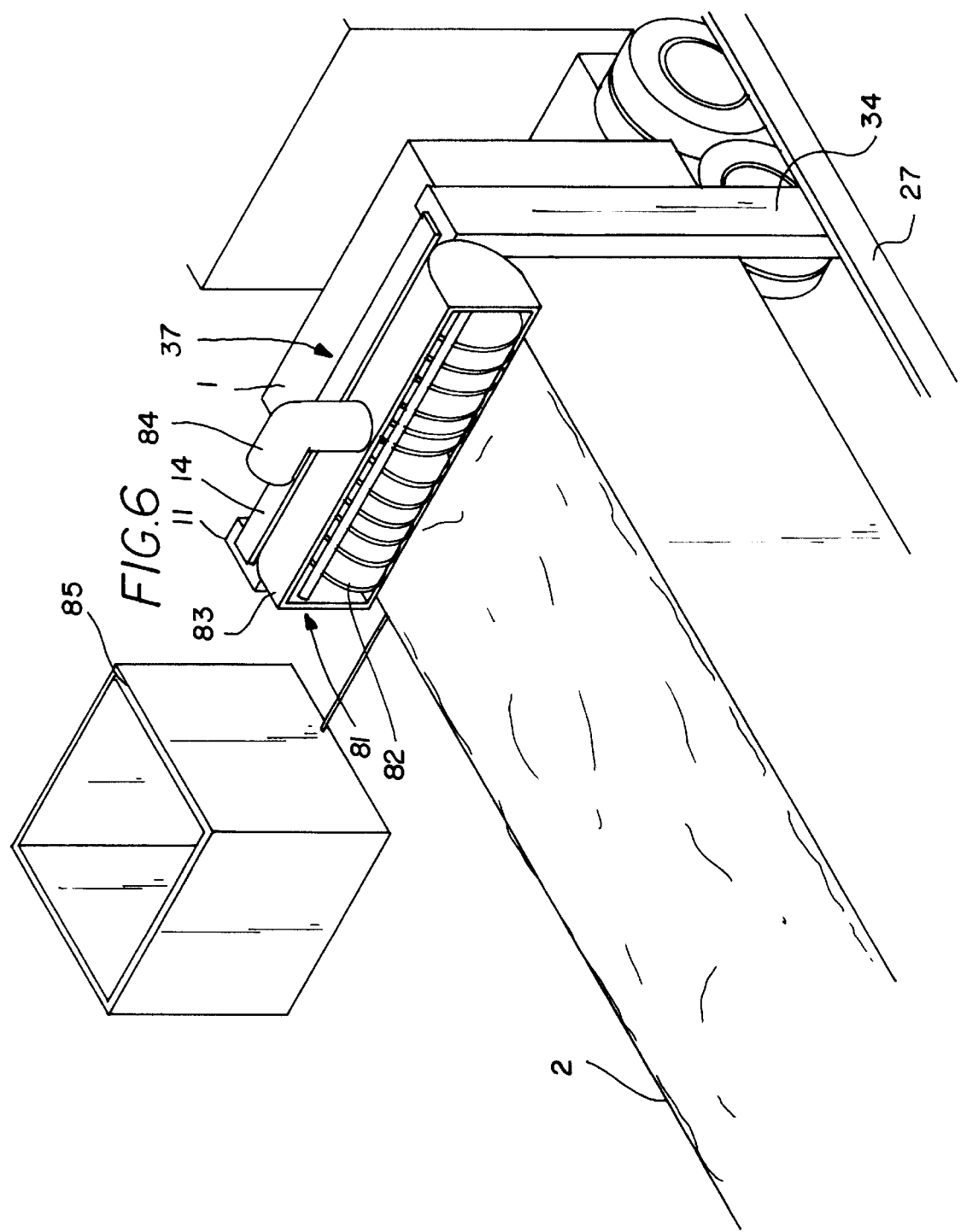

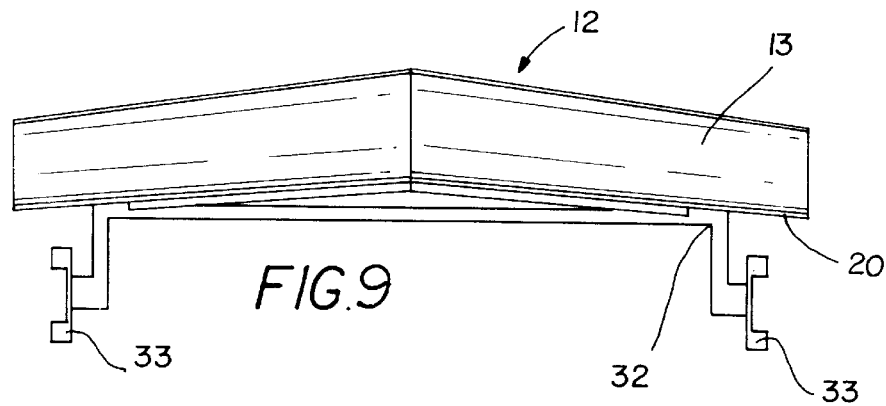
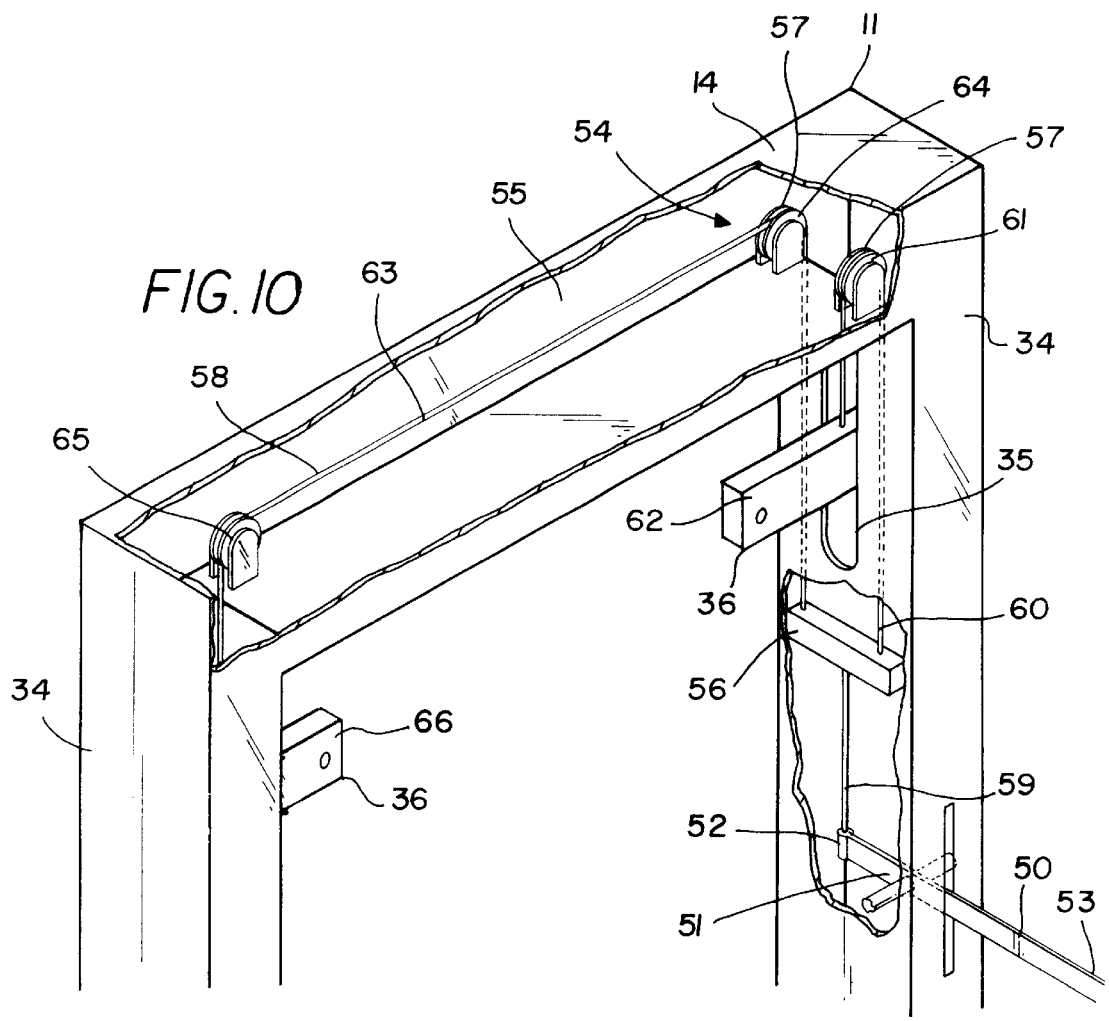

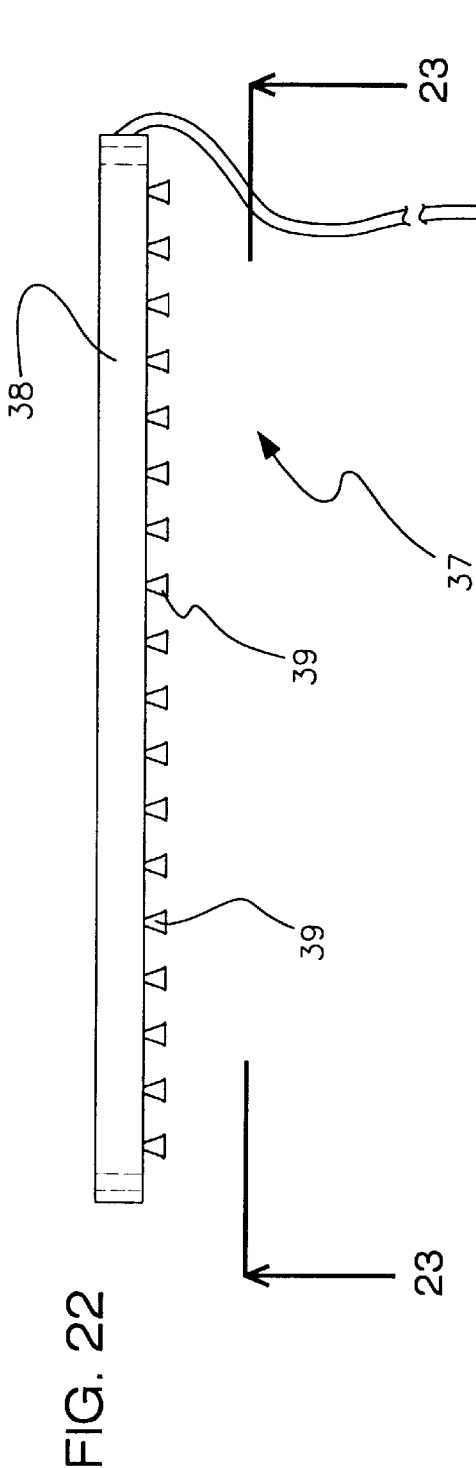
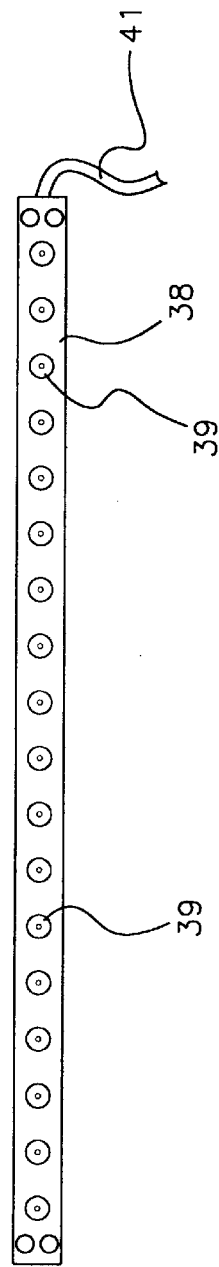
FIG. 22
FIG. 23

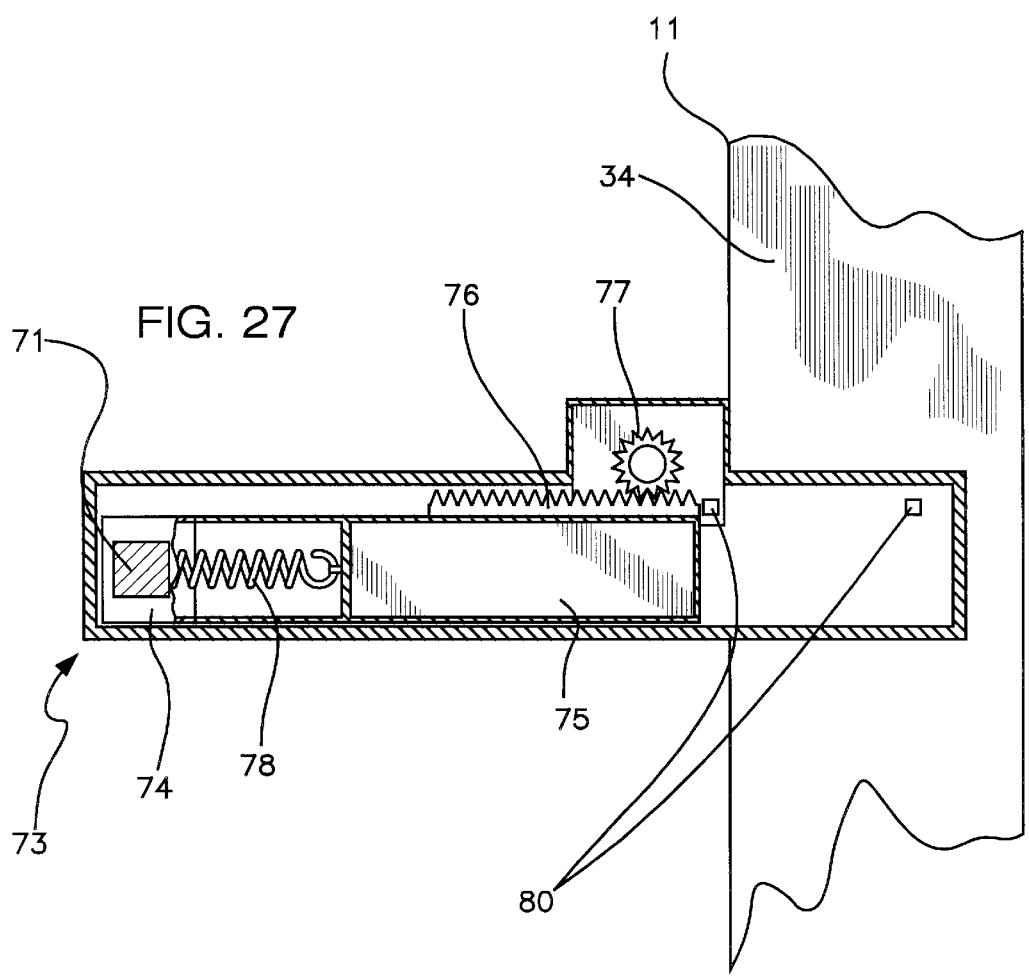

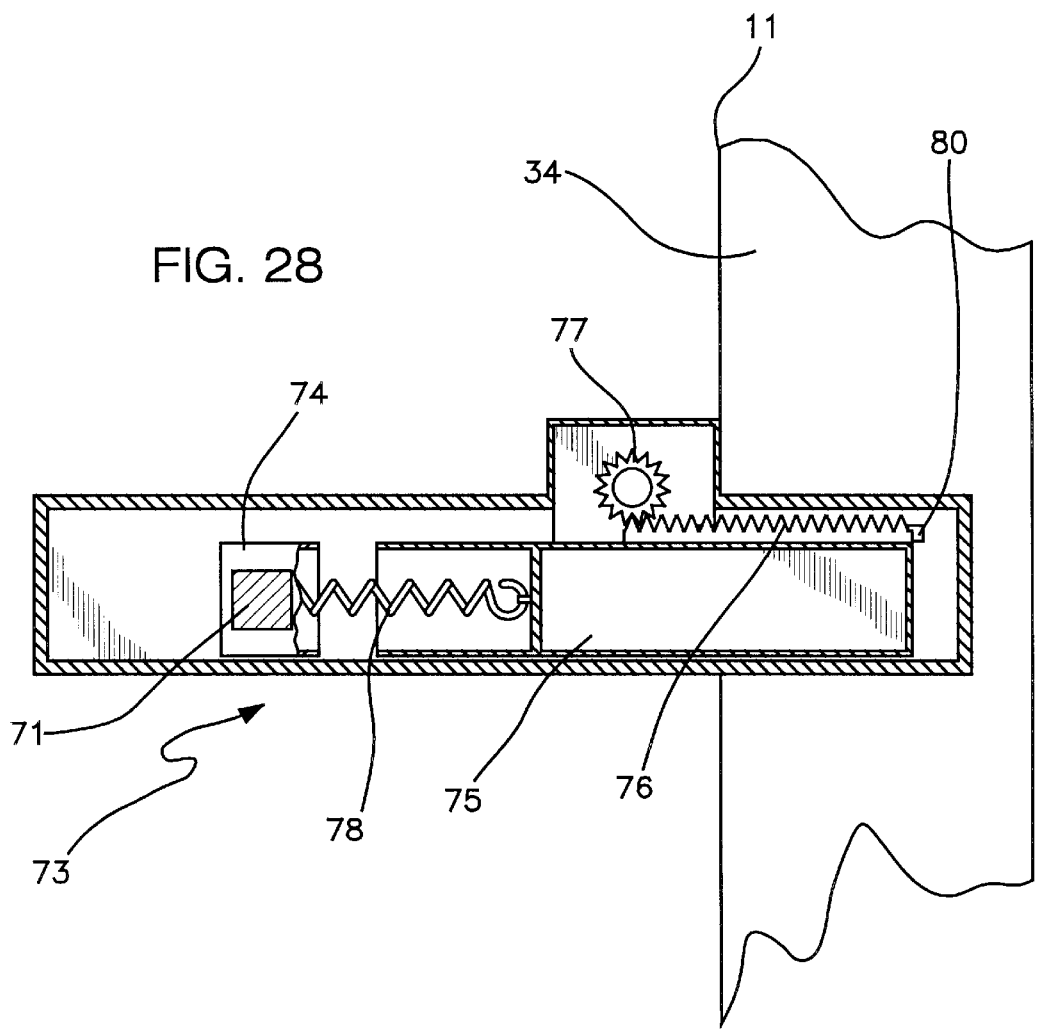

VEHICLE ROOF SNOW REMOVAL SYSTEM

BACKGROUND OF THE INVENTION

1. Field of the Invention

The present invention relates to snow and ice removers and more particularly pertains to a new vehicle roof snow removal system for removing snow and ice from the top of a vehicle, particularly a commercial vehicle or trailer.

2. Description of the Prior Art

The use of snow and ice removers is known in the prior art. More specifically, snow and ice removers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,908.289; U.S. Pat. No. 5,802,654; U.S. Pat. No. 5,093,951; U.S. Pat. No. 1,864,821; U.S. Pat. No. 4,949,423; and U.S. Pat. No. 3,104,406.

While these devices fulfill their respective, particular objectives and requirements, the aforementioned patents do not disclose a new vehicle roof snow removal system. The inventive device includes a main frame. A scraper blade assembly is coupled to the main frame. The scraper blade assembly comprises a scraper blade. The scraper blade is lowerable from a top of said main frame such that the scraper blade is designed for scraping snow from a roof of a vehicle passing through the main frame.

In these respects, the vehicle roof snow removal system according to the present invention substantially departs from the conventional concepts and designs of the prior art. and in so doing provides an apparatus primarily developed for the purpose of removing snow and ice from the top of a vehicle.

SUMMARY OF THE INVENTION

In view of the foregoing disadvantages inherent in the known types of snow and ice removers now present in the prior art, the present invention provides a new vehicle roof snow removal system construction wherein the same can be utilized for removing snow and ice from the top of a vehicle.

The general purpose of the present invention, which will be described subsequently in greater detail, is to provide a new vehicle roof snow removal system apparatus and method which has many of the advantages of the snow and ice removers mentioned heretofore and many novel features that result in a new vehicle roof snow removal system which is not anticipated, rendered obvious, suggested, or even implied by any of the prior art snow and ice removers, either alone or in any combination thereof.

To attain this, the present invention generally comprises a main frame. A scraper blade assembly is coupled to the main frame. The scraper blade assembly comprises a scraper blade. The scraper blade is lowerable from a top of said main frame such that the scraper blade is designed for scraping snow from a roof of a vehicle passing through the main frame.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicle roof snow removal system apparatus and method which has many of the advantages of the snow and ice removers mentioned heretofore and many novel features that result in a new vehicle roof snow removal system which is not anticipated, rendered obvious, suggested, or even implied by any of the prior art snow and ice removers, either alone or in any combination thereof.

It is another object of the present invention to provide a new vehicle roof snow removal system which may be easily and efficiently manufactured and marketed.

It is a further object of the present invention to provide a new vehicle roof snow removal system which is of a durable and reliable construction.

An even further object of the present invention is to provide a new vehicle roof snow removal system which is susceptible of a low cost of manufacture with regard to both materials and labor, and which accordingly is then susceptible of low prices of sale to the consuming public, thereby making such vehicle roof snow removal system economically available to the buying public.

Still yet another object of the present invention is to provide a new vehicle roof snow removal system which provides in the apparatuses and methods of the prior art some of the advantages thereof, while Simultaneously overcoming some of the disadvantages normally associated therewith.

Still another object of the present invention is to provide a new vehicle roof snow removal system for removing snow and ice from the top of a vehicle, commercial straight trucks and coaches.

Yet another object of the present invention is to provide a new vehicle roof snow removal system which includes a main frame. A scraper blade assembly is coupled to the main frame. The scraper blade assembly comprises a scraper blade. The scraper blade is lowerable from a top of said main frame such that the scraper blade is designed for scraping snow from a roof of a vehicle passing through the main frame.

Still yet another abject of the present invention is to provide a new commercial vehicle roof snow removal system which includes a main frame. A snow blower assembly comprises a snow blower that is lowered from a top of the main frame. The snow blower is designed for blowing snow from a roof of a commercial vehicle passing through the main frame.

Still yet another abject of the present invention is to provide a new commercial vehicle roof snow removal system which includes a main frame. A solution dispensing assembly comprises a sprayer housing that is lowered from a top of the main frame. The sprayer housing can dispense deicer fluid for deicing the hard bonded ice from a roof of a commercial vehicle passing through the main frame. Further, the solution dispensing assembly may be used with a wash down fluid for washing the dirt from a root of a commercial vehicle passing through the main frame.

Still yet another object of the present invention is to provide a new vehicle roof snow removal system that reduces the weight of snow and ice on a vehicle thereby improving fuel mileage.

Even still another object of the present invention is to provide a new vehicle roof snow removal system that maintains proper weight distribution between the axles by removing the snow and ice from the vehicle providing trailer stability.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is an front view of the present invention.

FIG. 3 is an front view of an embodiment of the scraper blade of the present invention.

FIG. 4 is a side view of the embodiment of the scraper blade of the present invention shown in FIG. 3.

FIG. 5 is a rear view of the scraper blade assembly of the present invention.

FIG. 6 is a perspective view of the snow blower embodiment of the present invention.

FIG. 9 is a bottom view of the scraper blade assembly of the present invention.

FIG. 10 is a partial cut-away perspective view of the an embodiment of the present invention.

FIG. 22 is a front view of the solution dispensing assembly of the present invention.

FIG. 23 is a bottom view of the solution dispensing assembly of the present invention.

FIG. 27 is a cross-sectional view of an embodiment of the chute frame assembly of the present invention.

FIG. 28 is a cross-sectional view of the embodiment of the chute frame assembly of the present invention shown in FIG. 27.

DESCRIPTION OF THE PREFERRED EMBODIMENT

Figure 1:
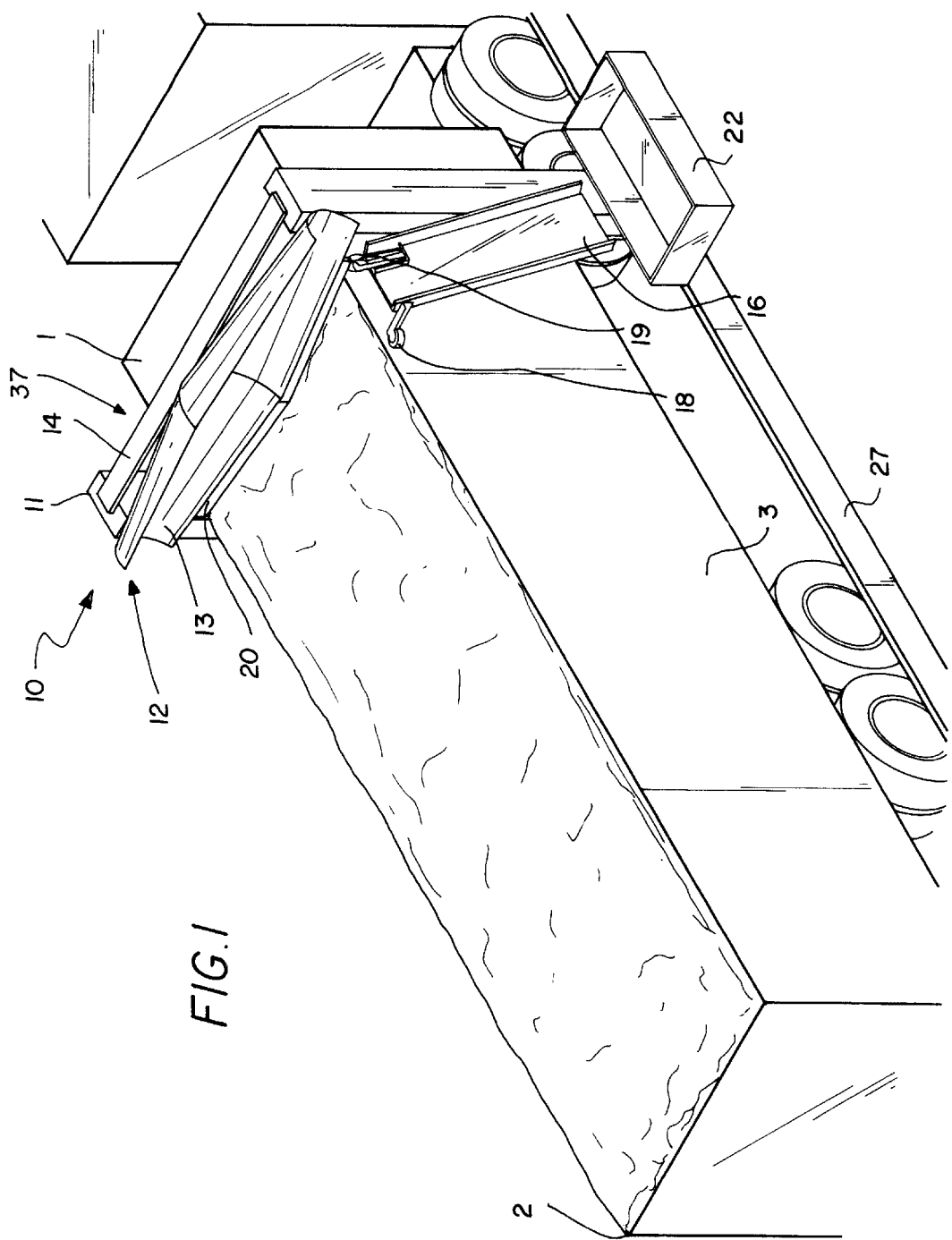
FIG. 1 is a perspective view of a new vehicle root snow removal system according to the present invention.
Figure 7:
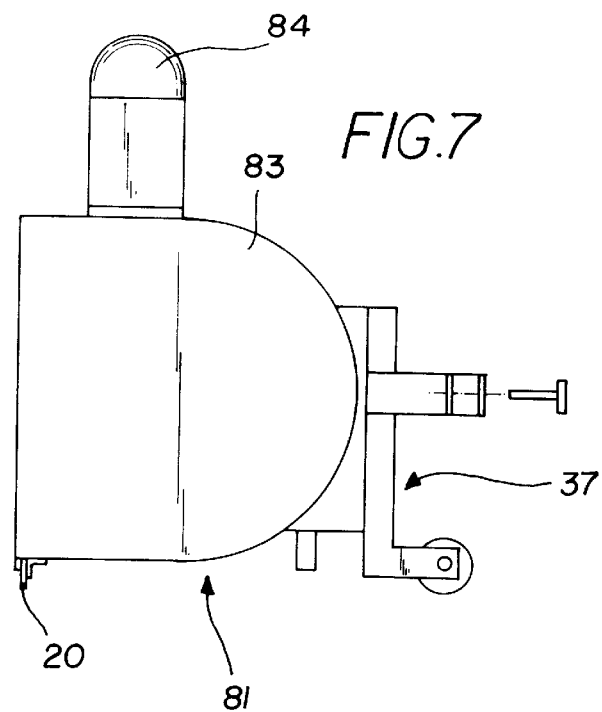
FIG. 7 is a side view of the snow blower embodiment of the present invention.
Figure 8:
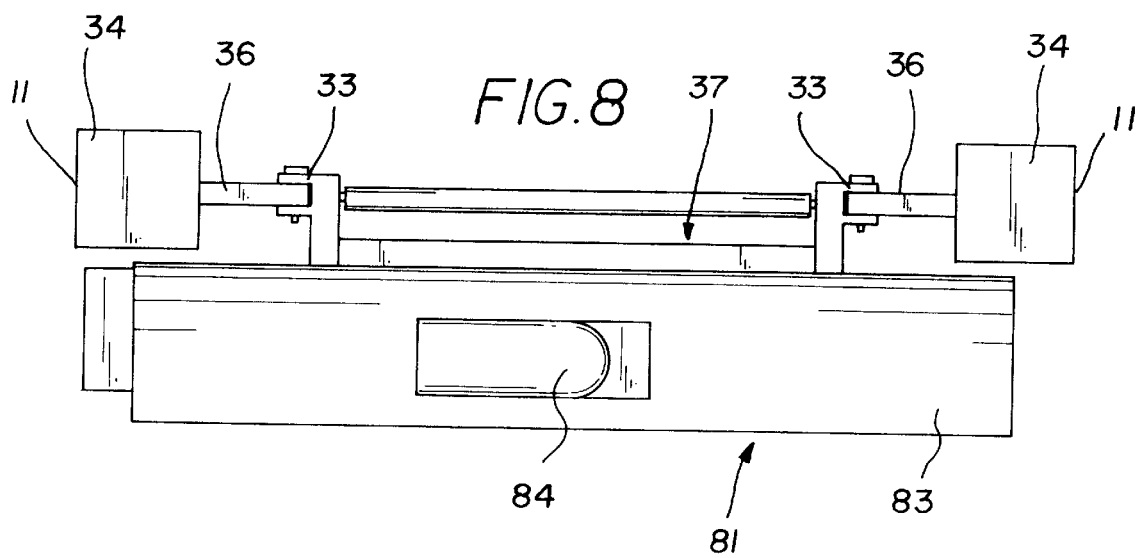
FIG. 8 is a top view of the snow blower embodiment of the present invention.
Figure 11:
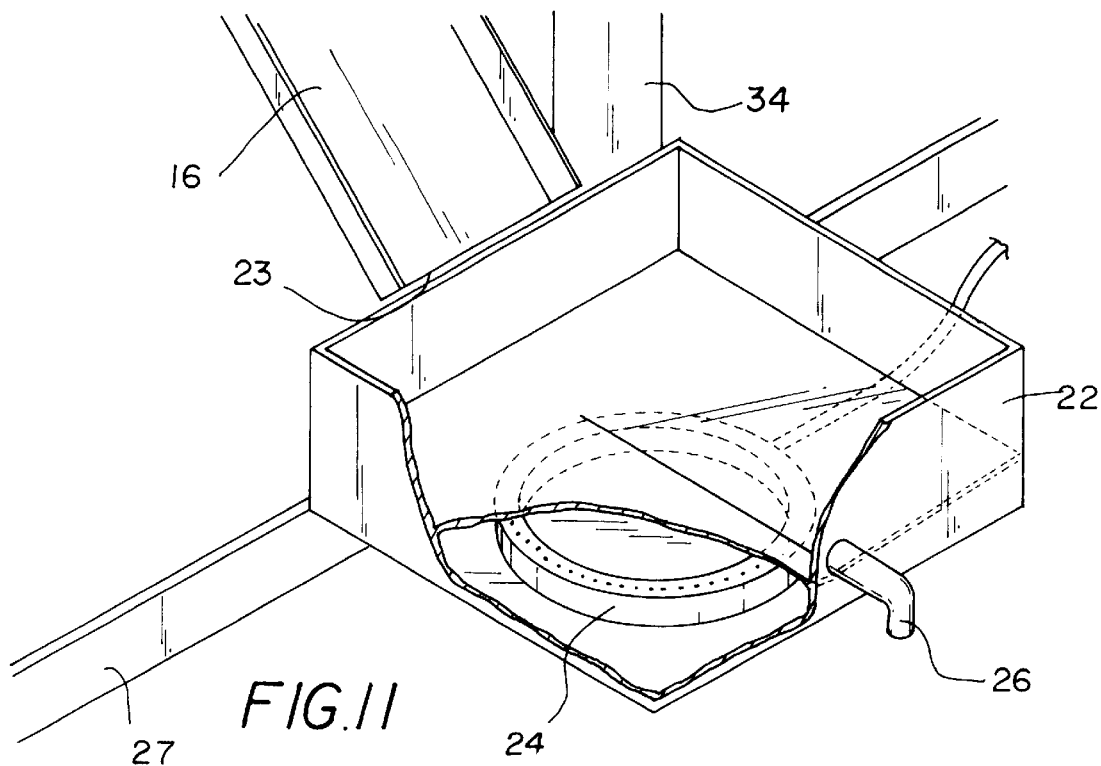
FIG. 11 is a perspective view of the snow receiving assembly of the present invention.
Figure 12:
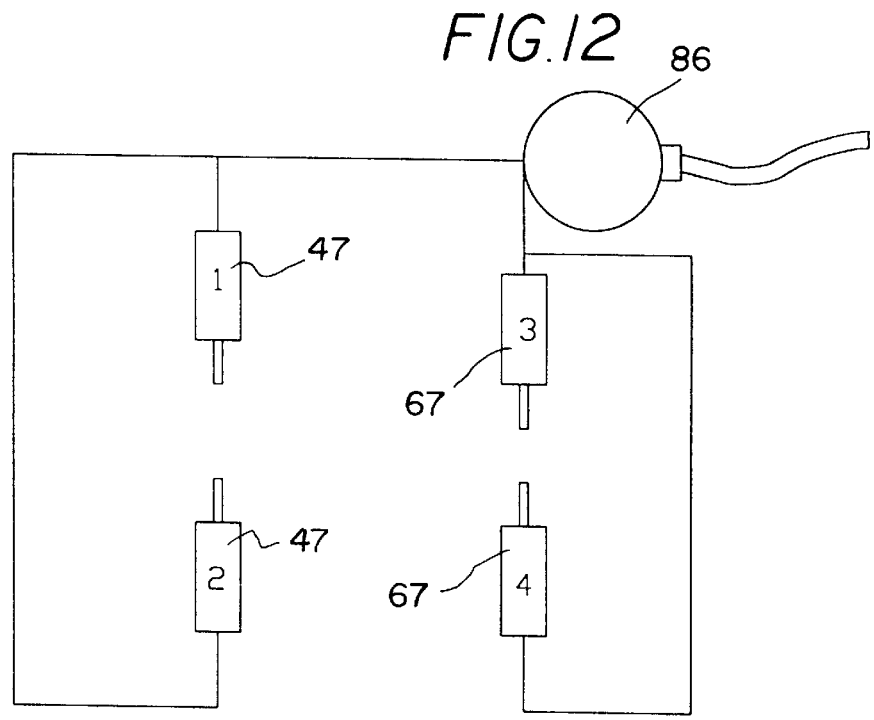
FIG. 12 is a schematic view of the pneumatic system of the present invention.
Figure 13:
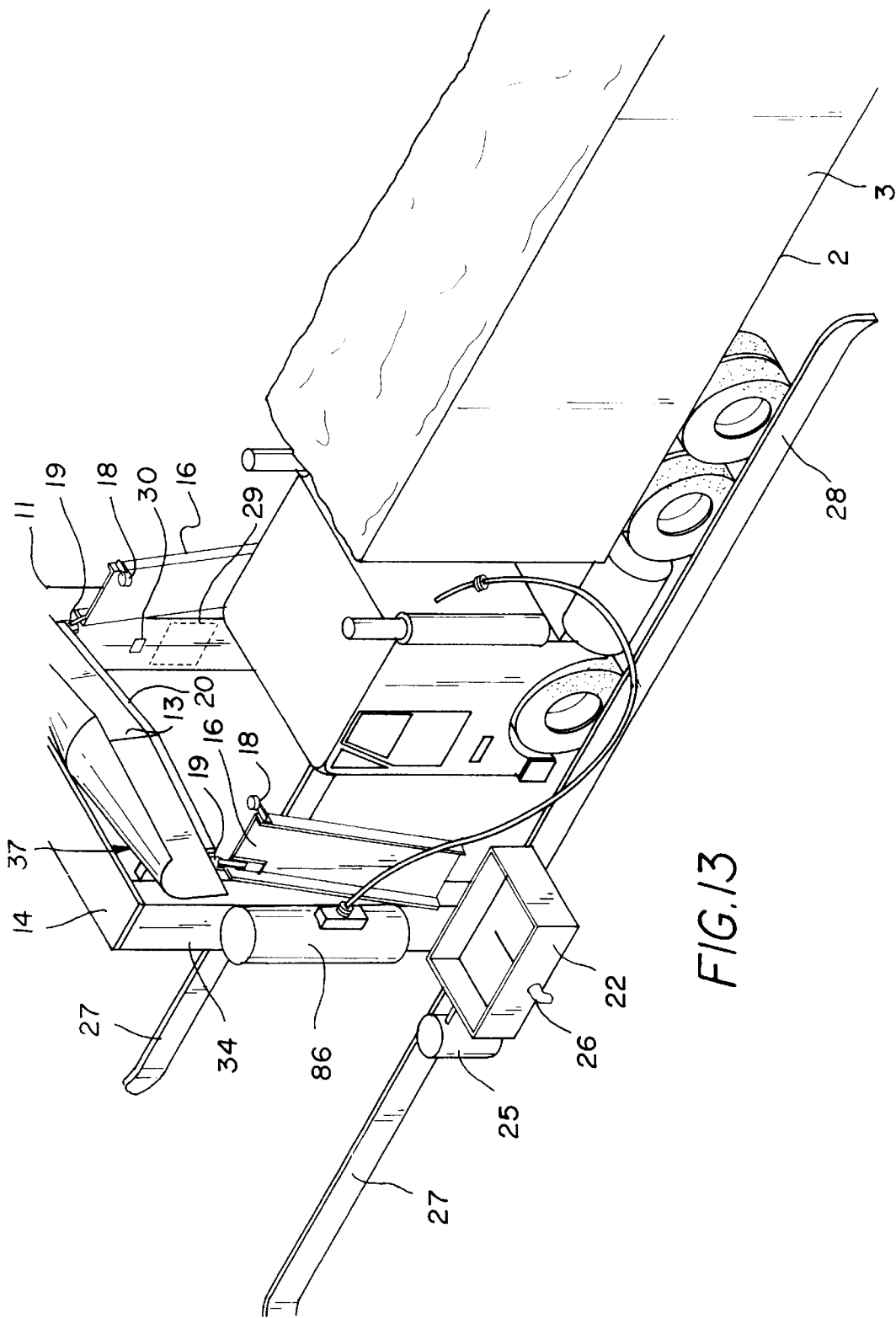
FIG. 13 is a perspective view of the present invention.
Figure 14:
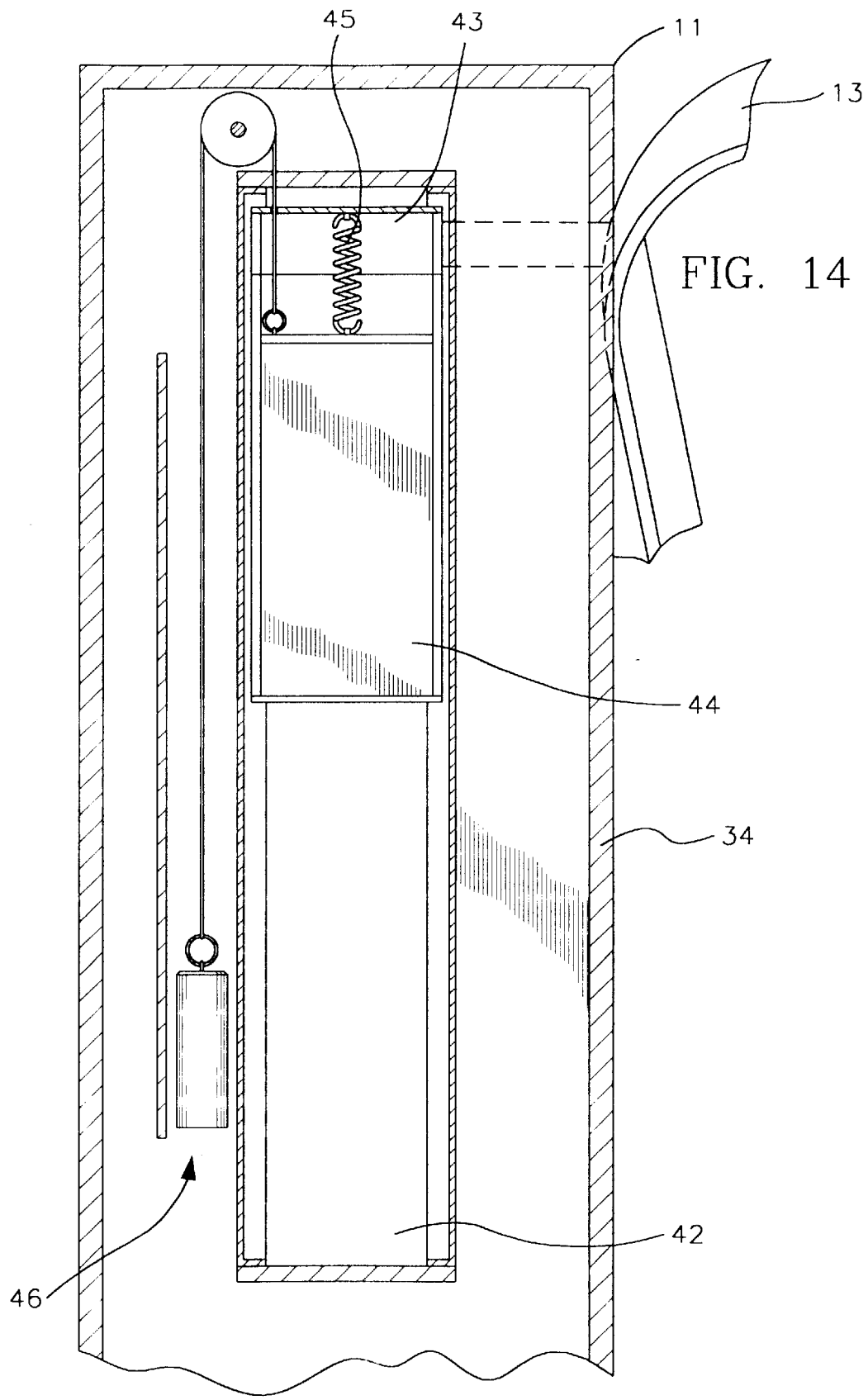
FIG. 14 is a partial cross-sectional view of an embodiment of the side housing within the main frame of the present invention.
Figure 15:
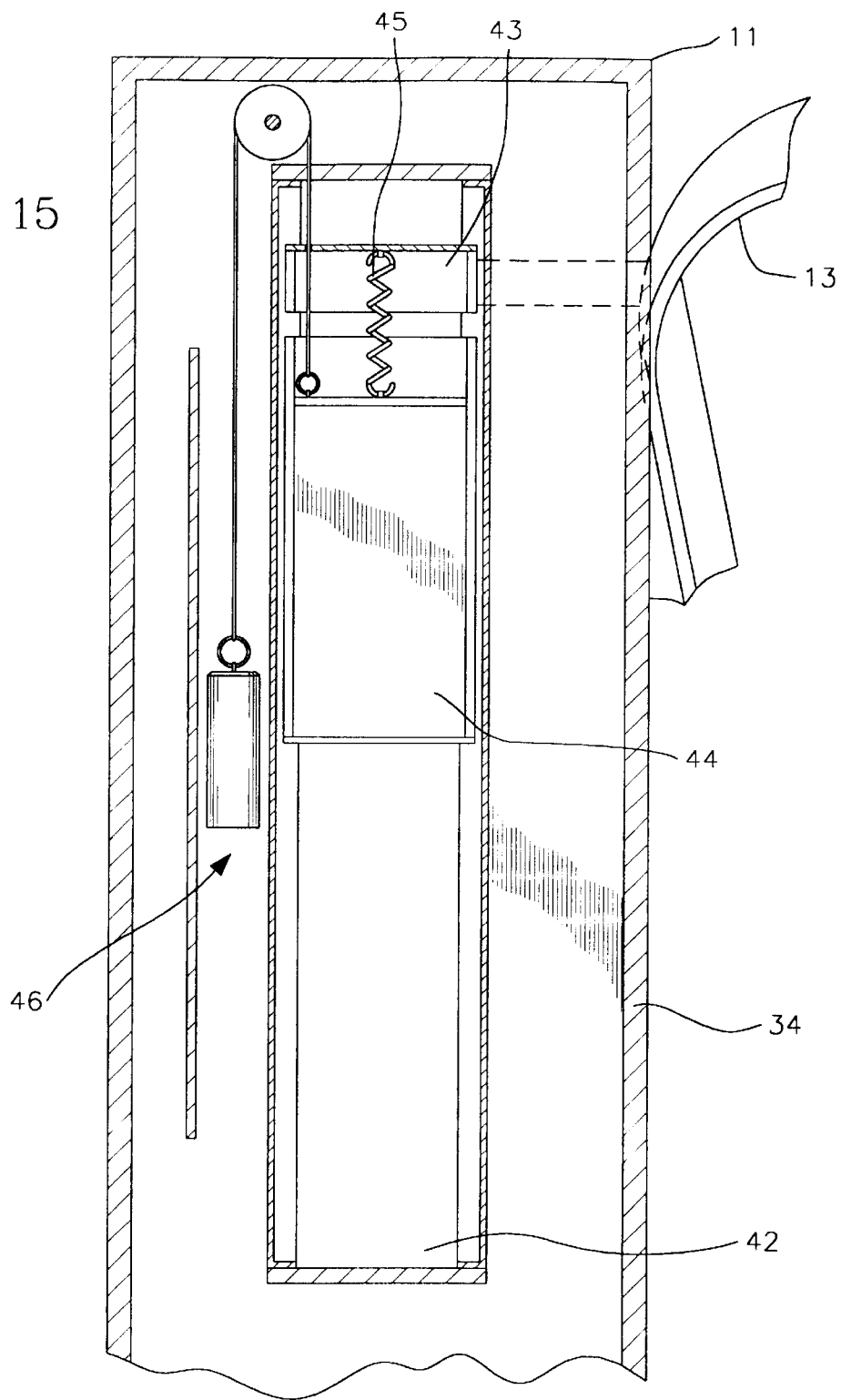
FIG. 15 is a partial cross-sectional view of the embodiment of the side housing within the main frame of the present invention shown in FIG. 14.
Figure 16:
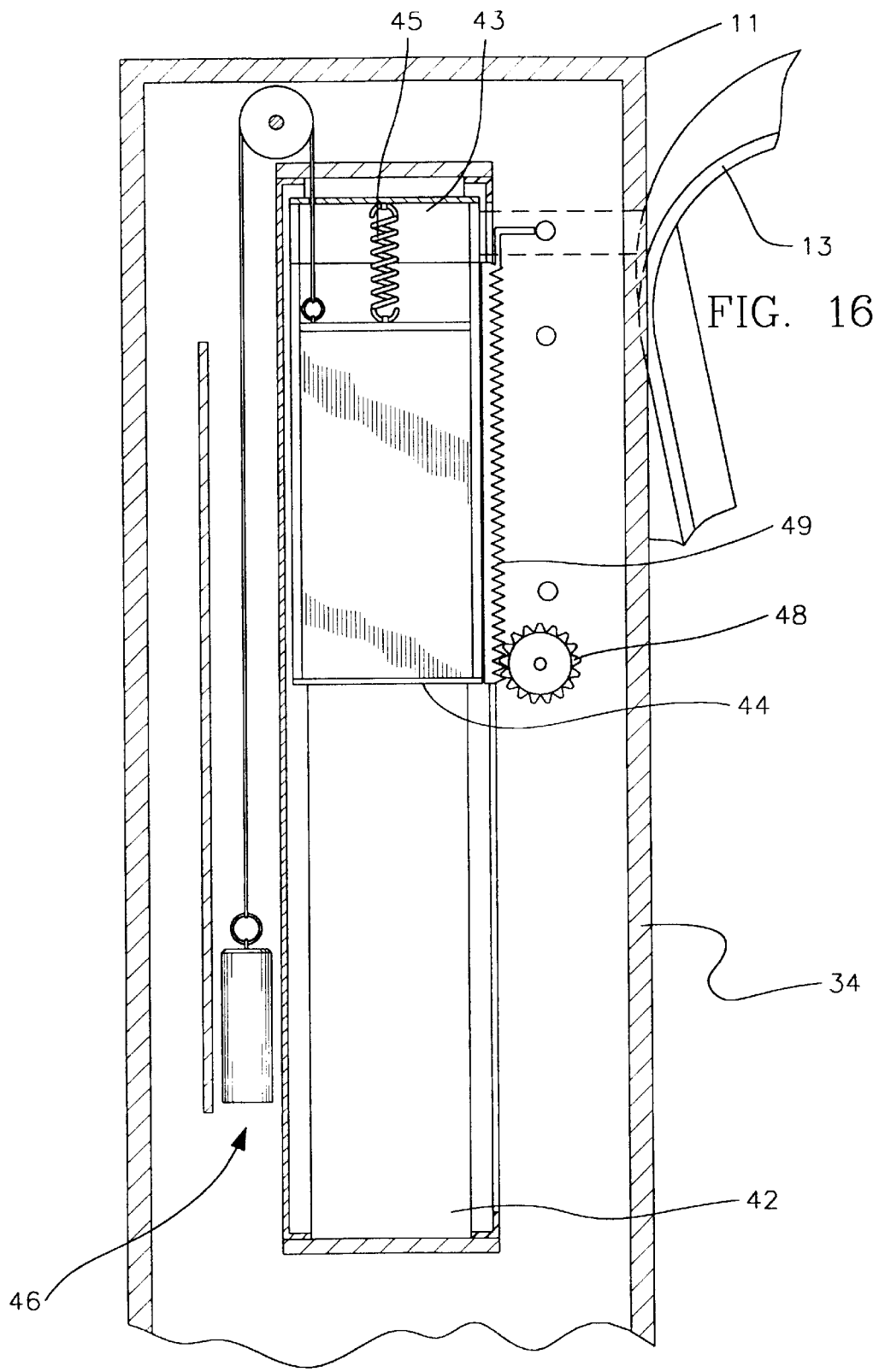
FIG. 16 is a partial cross-sectional view of an embodiment of the side housing within the main frame of the present invention.
Figure 17:
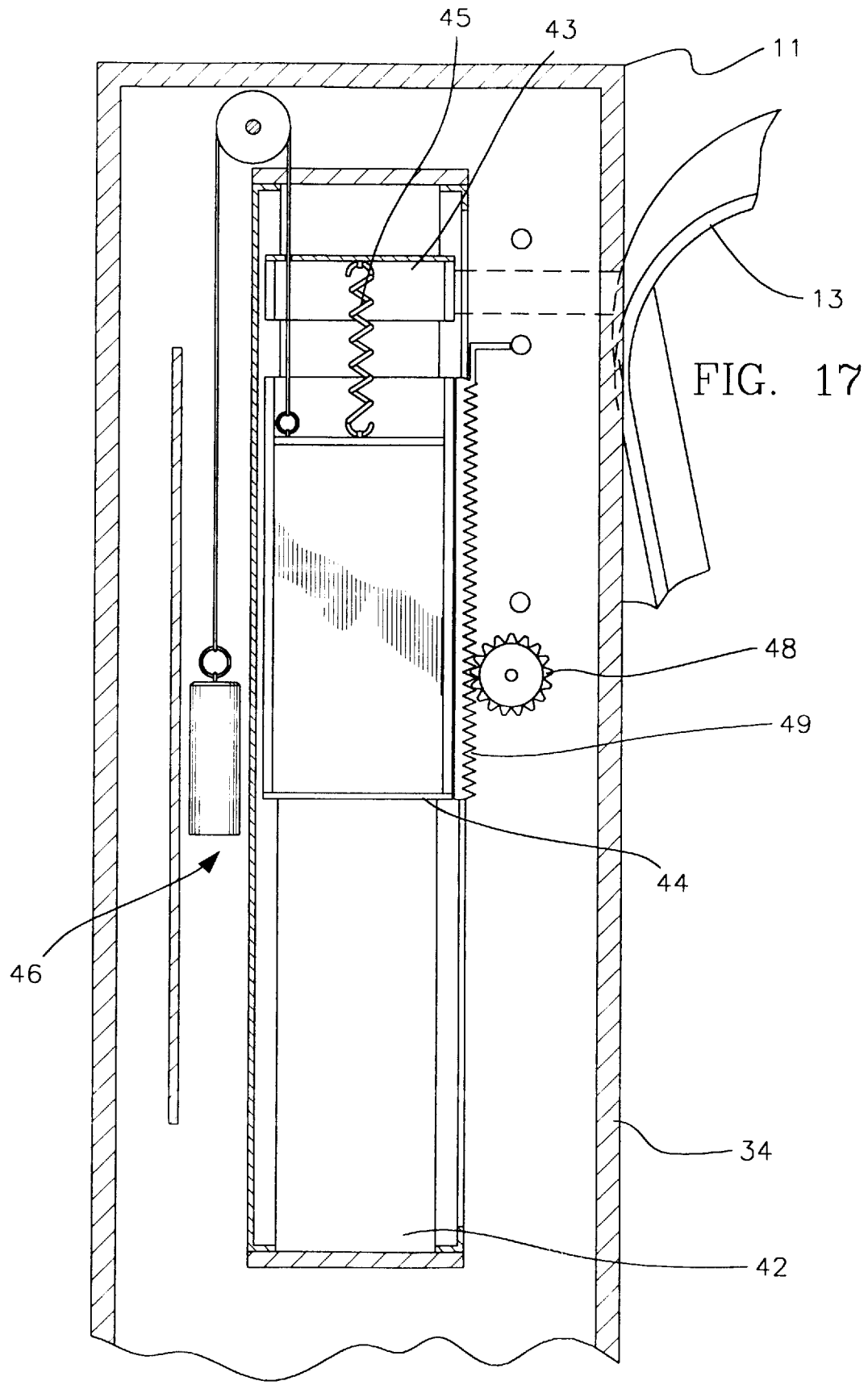
FIG. 17 is a partial cross-sectional view of the embodiment of the side housing of the present invention shown in FIG. 16.
Figure 18:
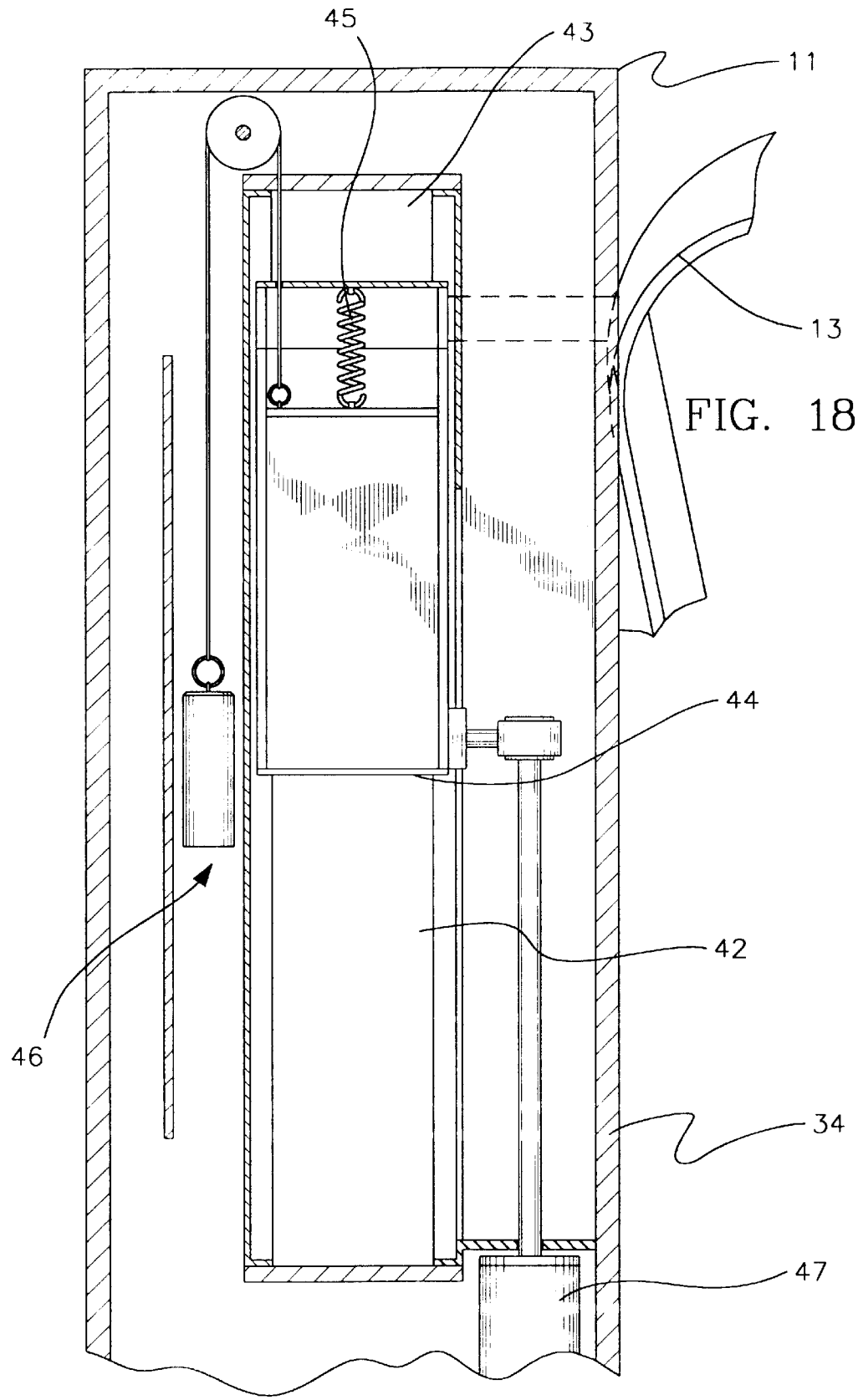
FIG. 18 is a partial cross-sectional view of an embodiment of the side housing of the present invention.
Figure 19:
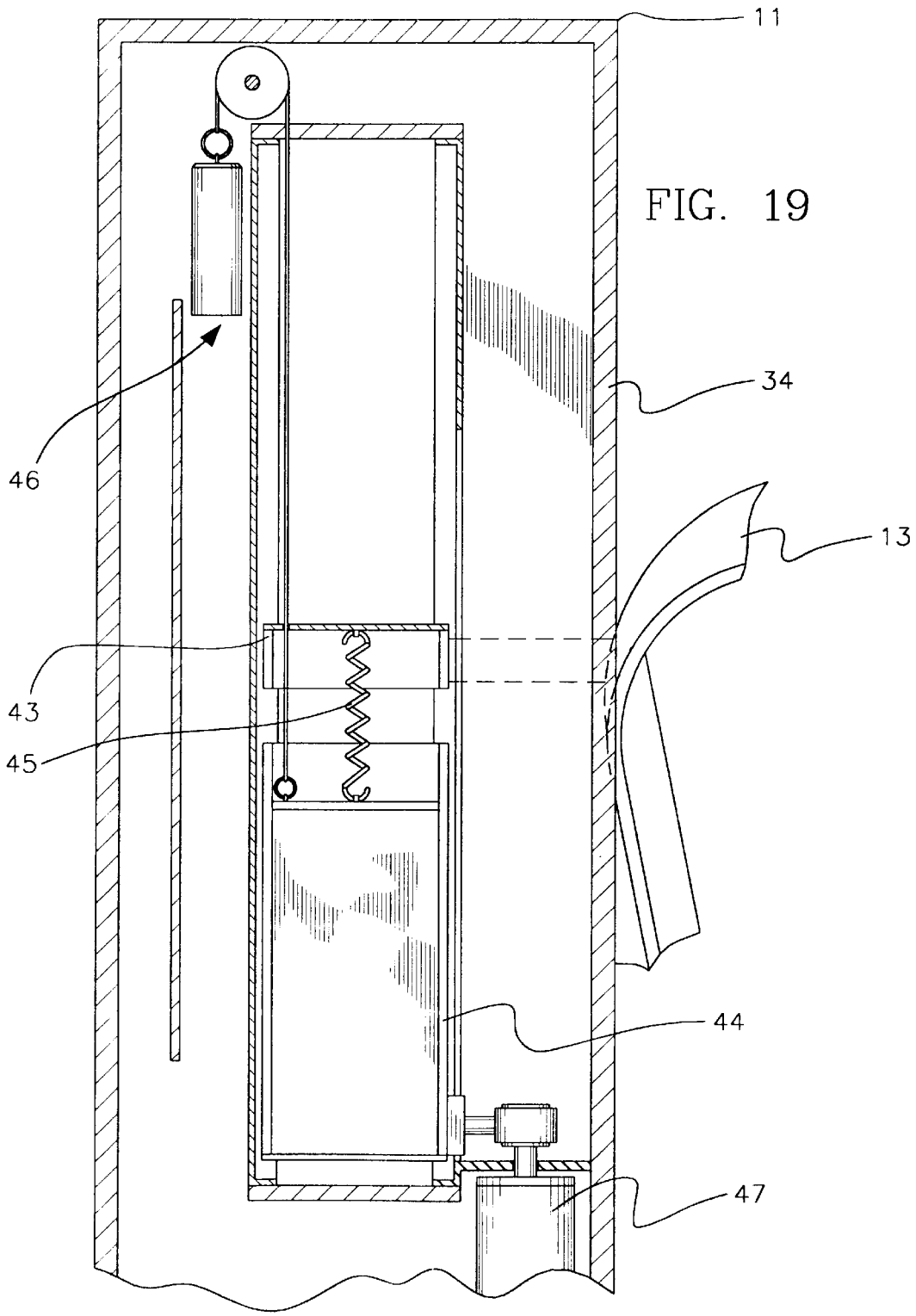
FIG. 19 is a partial cross-sectional view of the embodiment of the side housing of the present invention shown in FIG. 18.
Figure 20:
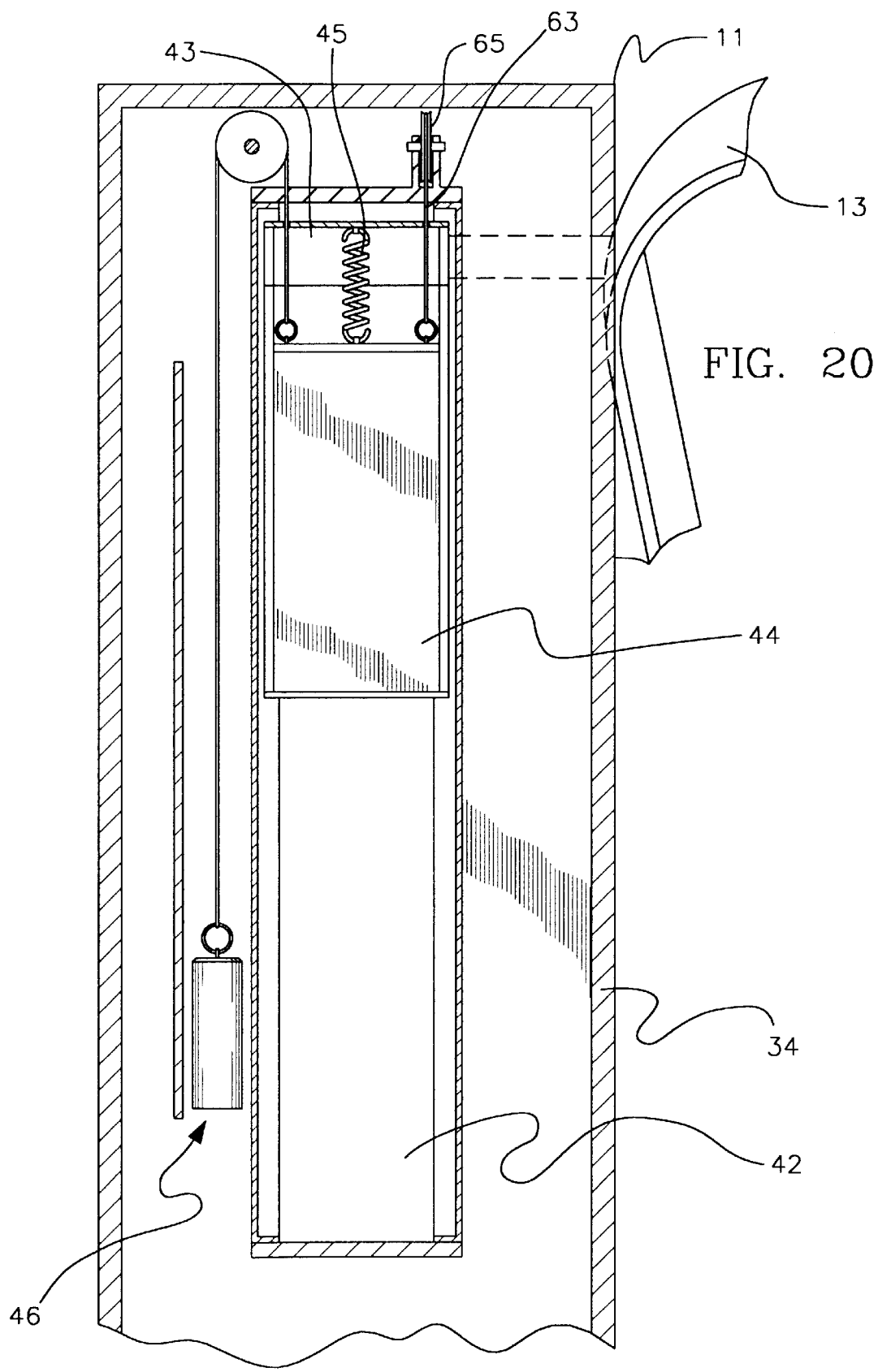
FIG. 20 is a partial cross-sectional view of an embodiment of the side housing of the present invention.
Figure 21:
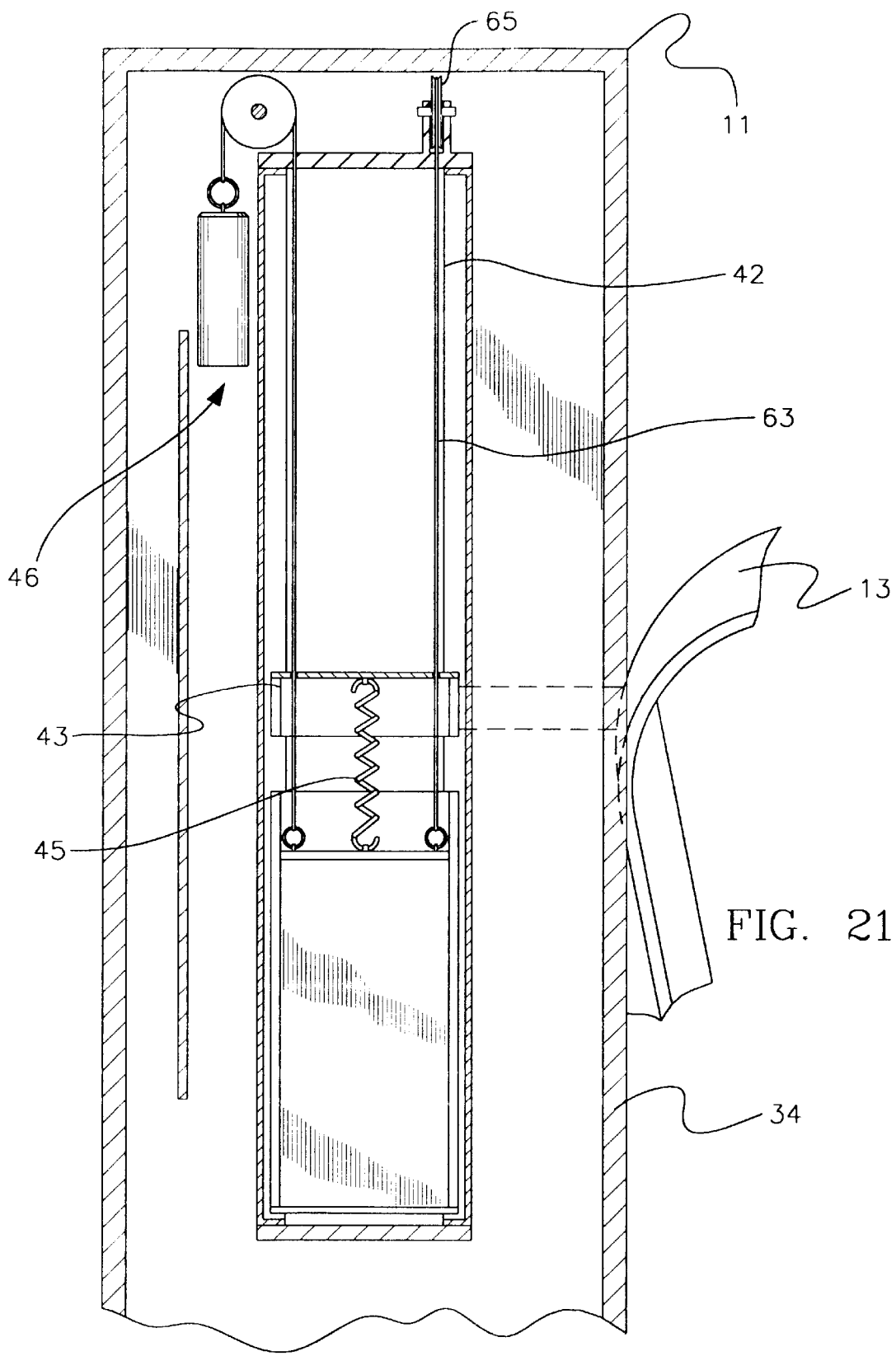
FIG. 21 is a partial cross-sectional view of the embodiment of the side housing of the present invention shown in FIG. 20.
Figure 24:
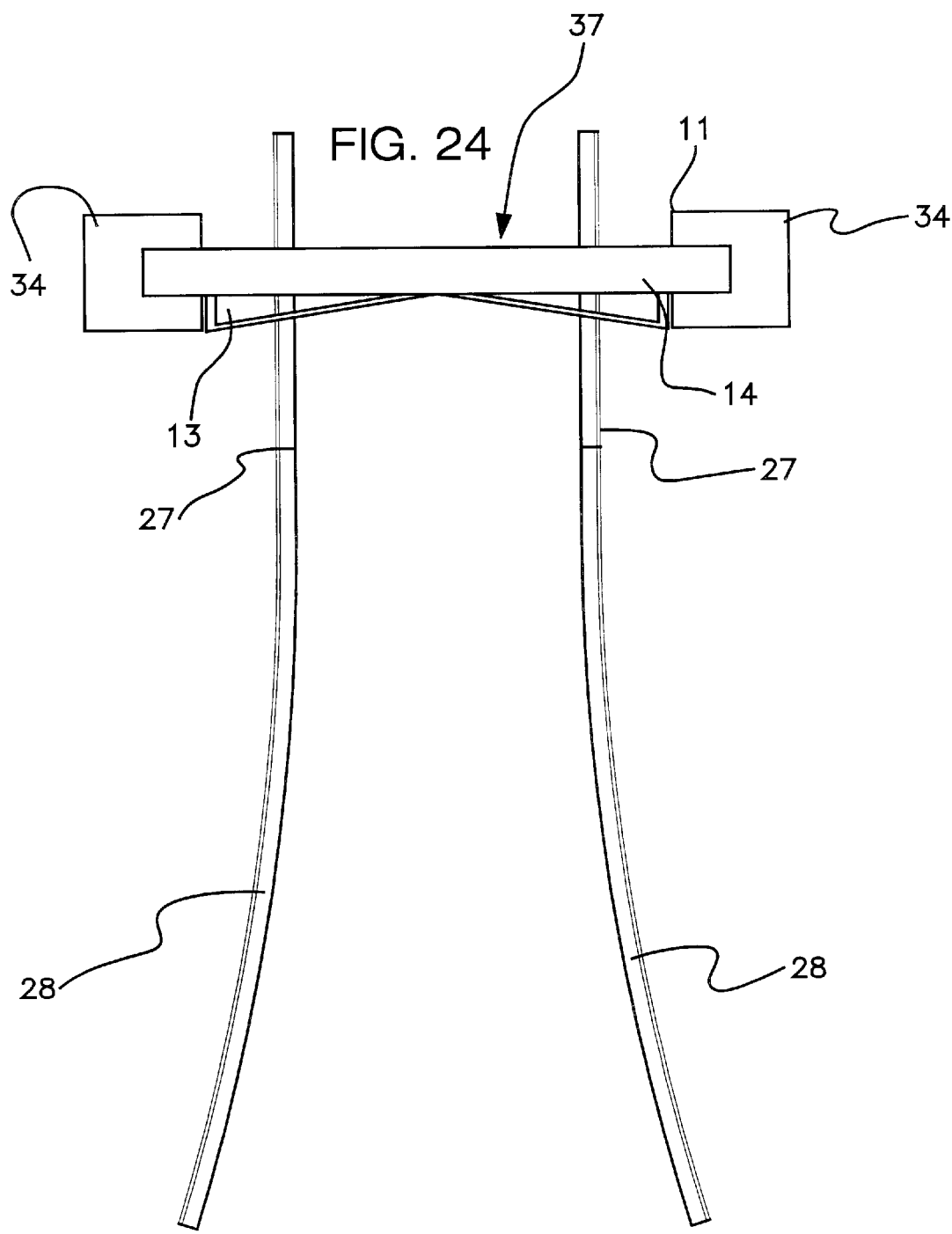
FIG. 24 is a top view of the present invention.
Figure 25:
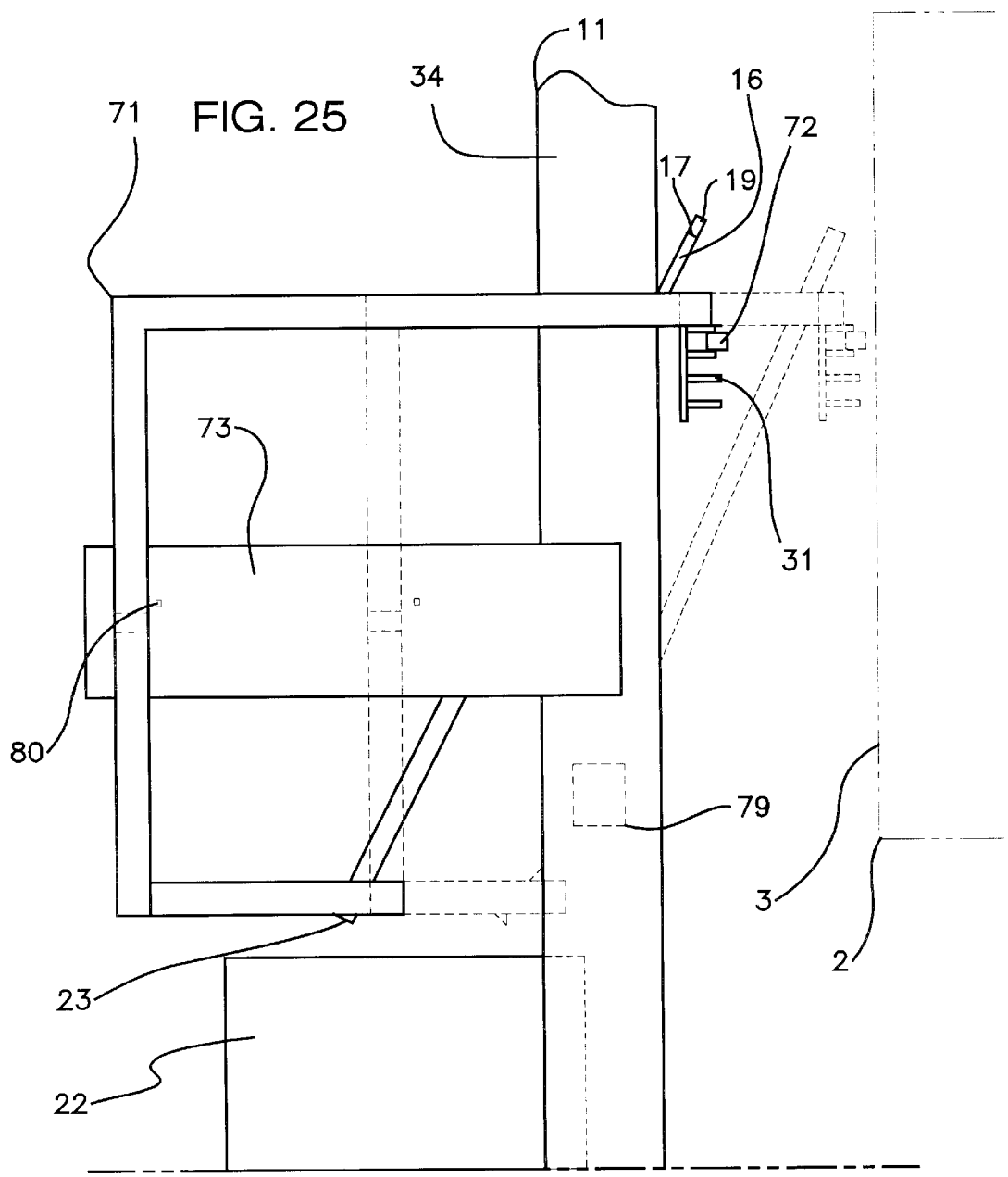
FIG. 25 is a rear view of the snow chute of the present invention.
Figure 26:
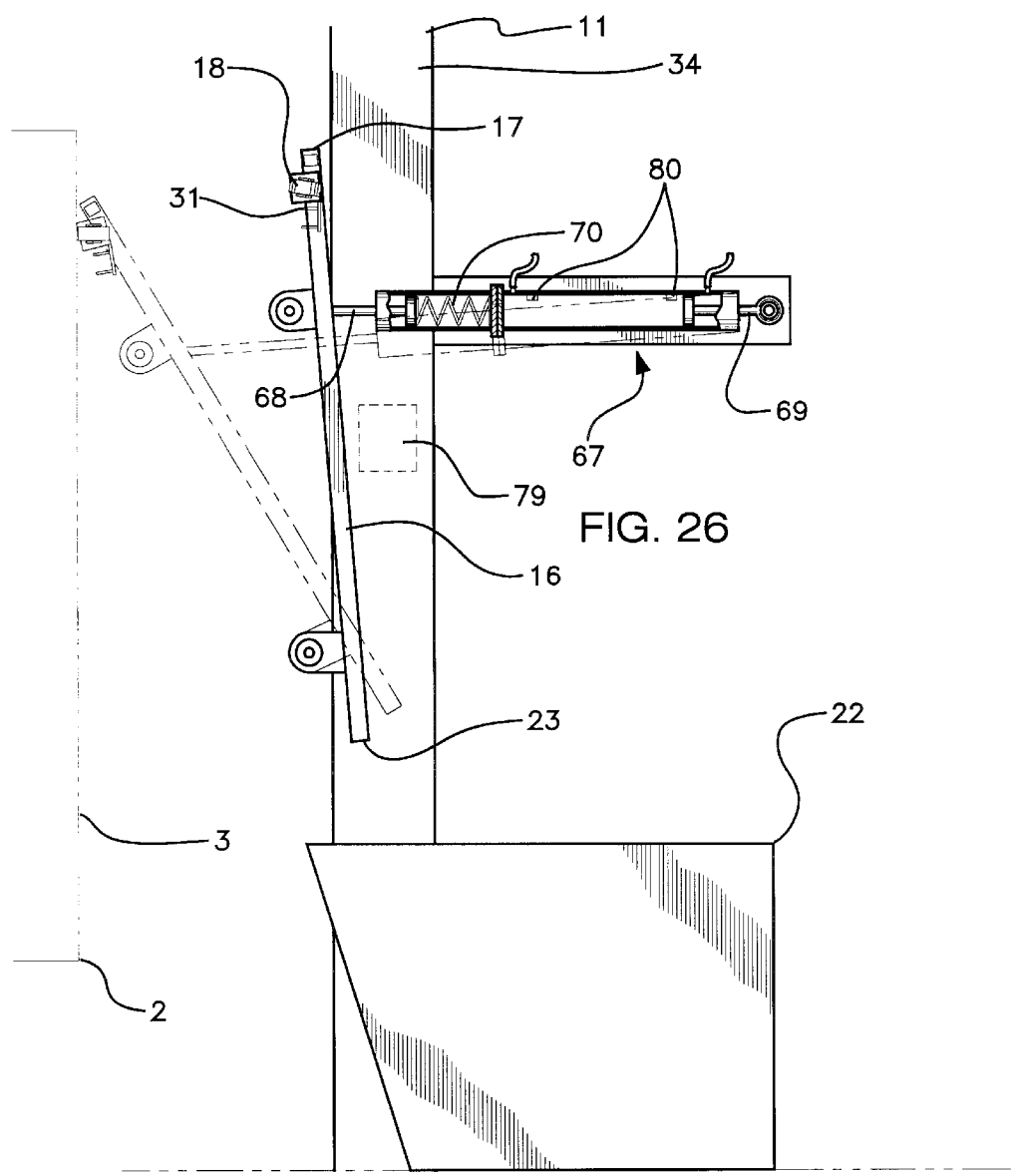
FIG. 26 is a front view of the snow chute of the present invention.

With reference now to the drawings, and in particular to FIGS. 1 through 28 thereof, a new vehicle roof snow removal system embodying the principles and concepts of the present invention and generally designated by the reference numeral 10 will be described.

As best illustrated in FIGS. 1 through 28, the vehicle roof snow removal system 10 generally comprises a main frame 11. A scraper blade assembly 12 is coupled to the main frame. The scraper blade assembly comprises a scraper blade 13. The scraper blade is lowered from a top 14 of the main frame such that the scraper blade is designed for scraping snow from a roof 1 of a commercial vehicle 2 passing through the main frame. As shown in FIG. 3, the scraper blade assembly can have an arcuate configuration to accommodate vehicles having a radius roof. A scraper roller 15 is coupled to the scraper blade assembly. The scraper roller is designed for rolling against the root of the vehicle for preventing the scraper blade assembly from damaging the roof of the vehicle. A squeegee assembly 20 is coupled to the scraper blade assembly. A lower edge of a squeegee blade contacts the roof of the vehicle when the scraper blade assembly is in a lowered position. The squeegee assembly prevents the scraper blade assembly from damaging the roof of the commercial vehicle as well as squeegeeing any watery snow or water off of the roof of the commercial vehicle.

A pair of snow chutes 16, each being coupled to an associated side of the main frame. Each snow chute is positioned to direct snow scraped by the scraper blade away from the main frame while the vehicle passes through the main frame. Each snow chute is pivotally coupled to the associated side of the main frame for pivoting a respective top 17 of each snow chute towards the vehicle while the vehicle passes through the main frame. A pair of first chute rollers 18, each being coupled to an associated one of the snow chutes. Each first chute roller is designed for rolling against an associated side 3 of the vehicle as the vehicle passes through the main frame for preventing the top of the associated snow chute from scraping against the vehicle. In an embodiment, a second chute roller 19 is coupled to the top of the snow chute. The second roller contacts a distal portion 21 of the scraper blade assembly for pivoting the top of the snow chute towards a center of the scraper blade assembly when the scraper blade assembly is lowered relative to the top of said main frame.

A pair of snow receiving assemblies 22, each being positioned at a base 23 of an associated one of the snow chutes for receiving snow directed by the associated snow chute. Each snow receiving assembly is heated for melting the snow received by the snow receiving assembly such as by a fuel burner 24 supplied by a fuel supply 25 located outside the snow receiving assemblies. Each the snow receiving assembly includes a drain 26 for draining the melted snow out of the snow receiving assembly and draining into a drain.

A pair of spaced guides 27 are designed for engaging the vehicle. The guides are aligned with the main frame such that the guides align the vehicle with the main frame whereby the vehicle passes through the main frame as the vehicle is moved forwardly while engaged to the guides. Each of the spaced guides comprises an arcuate end portion 28 positioned such that the a space between the spaced guides narrows approaching the main frame for facilitating aligning the vehicle for passing through the main frame.

A control unit 29 is operationally coupled to the scraper blade assembly for lowering the scraper blade relative to the main frame. A main sensor 30 is coupled to the main frame for detecting the vehicle passing through the main frame. The main sensor is coupled to the control unit whereby the control unit lowers the scraper blade upon detection of the vehicle passing through the main frame by the main sensor. The control unit is operationally coupled to the snow chute for pivoting or sliding a top of the snow chute towards a center of the scraper blade. A pair of chute contact sensors 31, each being coupled to the top of an associated one of the snow chutes for detecting the first roller contacting the side of the commercial vehicle. Each chute contact sensor is coupled to the control unit whereby the control unit ceases movement of the top of the associated snow chute upon the chute contact sensor detecting the first roller contacting the vehicle.

The scraper blade assembly includes a scraper frame 32 coupled to the scraper blade. The scraper frame comprises a pair of connection portions 33. Each connection portion extends from an associated side of the scraper frame. The main frame includes a pair of side housings 34. Each side housing comprises a mounting slot 35. A pair of mounting brackets 36, each being slidably positioned within an associated one of the side housings of the main frame and extending outwardly from the associated side housing through the associated mounting slot. Each the connection portion of the scraper frame is coupled to an associated one of the mounting brackets whereby the scraper assembly is slidably mounted to the main frame.

A deicing assembly 37 is coupled to the main frame. The deicing assembly is designed for spraying a deicer on the roof of the vehicle after the scraper blade scrapes snow from the roof of the vehicle. The deicing assembly includes a sprayer housing 38 comprising a plurality of spaced nozzles 39. Each of the nozzles is positioned for directing the deicer downwardly onto the roof of the vehicle as the vehicle passes through the main frame. The deicing assembly includes a deicer tank 40 for holding a supply of the deicer. A dispensing tube 41 is coupled between the deicer tank and the sprayer housing for delivering the deicer from the deicer tank to the sprayer housing for dispensing the deicer through the nozzles. In an embodiment, the deicing tank can hold a wash solution such that the deicing assembly dispenses wash solution for cleaning the top of the vehicle from dirt and debris.

Each side housing comprises a central post 42. A pair of first collars 43 each being coupled to an associated one of the central posts. Each mounting bracket is coupled to an associated one of the first collars. A pair of second collars 44 each being slidably coupled to an associated one of the central posts. Each second collar is positioned adjacent an associated one of the first collars.

A pair of spring members 45 each being coupled between an associated first collar and the associated second collar for biasing the associated first and second collars towards each other on the associated central post. A pair of counterweight assemblies 46 each being coupled to an associated second collar. A pair of piston assemblies 47, each being positioned in an associated one of the side housings. Each piston assembly is coupled to an associated one of the second collars whereby extension of the each piston assembly slides the associated second collar on the associated central post. Each piston assembly is operationally coupled to the control unit whereby each piston assembly is actuatable by the control unit upon detection of the vehicle passing through the main frame by the main sensor such that the scraper blade is lowered upon detection of the vehicle passing through the main frame by the main sensor. In an embodiment, a pair of drive gears 48 are each positioned in an associated one of the side housings. Each second collar includes an associated set of teeth 49. Each drive gear is engaged to the associated set of teeth of an associated second collar such that rotating the drive gear slides the associated second collar on the associated central post. Each drive gear is operationally coupled to the control unit whereby each drive gear is actuatable by the control unit upon detection of the vehicle passing through the main frame by the main sensor such that the scraper blade is lowered upon detection of the vehicle passing through the main frame by the main sensor.

In another embodiment, a handle 50 extends from one of the side housings. A medial portion 51 of the handle is pivotally coupled within the housing such that an interior end 52 of the handle is movable when an exterior end 53 of the handle is manipulated by a user. A cable assembly 54 couples the interior end of the handle to each of the mounting brackets such that manipulation of the exterior end of the handle selectively lowers and elevates the scraper assembly. The main frame includes an upper housing 55 extending between upper ends of the side housings. The cable assembly includes a cable junction 56, a plurality of pulleys 57, and three cables 58. A first one of the cables 59 extends between the interior end of the handle and the cable junction. A second one of the cables 60 extends through a first one of the pulleys 61. The second cable is coupled to a first one of the mounting brackets 62. A third one of the cables 63 extends through a second one of the pulleys 64, the upper housing, and a third one of said pulleys 65. The third cable is coupled to a second one of the mounting brackets 66.

A pair of chute piston assemblies 67, each comprise a first end 68 pivotally coupled to an associated one of the snow chutes. Each chute piston assembly comprises a second end 69 coupled to the main frame whereby each snow chute is pivotable or slidable towards a center of the scraper blade when the associated chute piston assembly is extended. A pair of chute piston spring members 70, each being coupled between the first end and the second end of an associated one of the chute piston assemblies such that each chute piston assembly is compressible for preventing the snow chute from damaging the vehicle.

The snow chute is coupled to a snow chute frame 71. The snow chute frame is coupled to the main frame. The snow chute frame is extendable towards a center of the main frame such that the snow chute is designed for being positioned adjacent to a side of the vehicle as the vehicle passes through the main frame. A chute frame roller 72 is coupled to the snow chute frame. The chute frame roller is designed for rolling against a side of the vehicle as the vehicle passes through the main frame for preventing the top of the snow chute from scraping against the vehicle. A chute frame rod assembly 73 comprises a first end 74 coupled to the snow chute frame. The chute frame rod assembly comprises a second end 75 slidably coupled to the main frame for extending the snow chute frame from the main frame. The chute frame rod assembly comprises a plurality of teeth 76 extending proximate the second end of the chute frame rod assembly. A frame drive gear 77 is coupled to the main frame and engages the plurality of teeth for selectively extending and retracting the snow chute frame when the drive gear is rotated. The chute frame rod assembly includes a chute frame spring member 78 coupled between the first end and the second end of the chute frame rod assembly such that the chute frame assembly is compressible for preventing the snow chute from damaging the vehicle when the snow chute frame is extended. A chute control unit 79 is operationally coupled to the snow chute frame for extending the snow chute frame. A chute sensor 80 is coupled to the snow chute frame for detecting when the vehicle passes through the main frame. The chute sensor is operationally coupled to the chute control unit whereby the chute control unit rotates the chute drive gear to extend the snow chute frame upon the chute sensor detecting the vehicle passing through the main frame.

In an embodiment, a snow blower assembly 81 is coupled to the main frame. The snow blower assembly comprises an auger 82. The snow blower assembly is lowerable from the main frame such that the auger is designed for scraping snow from a roof of a vehicle passing through the main frame. The snow blower assembly comprises a D-shaped housing 83 wherein the auger is contained within the housing. A directional chute 84 is coupled to the top of the housing for guiding snow and ice scraped from the top of the vehicle by the auger into a holding bin 85.

A pressure tank 86 is provided for providing pressure to operate the piston assemblies and the chute piston assemblies. The pressure for the pressure tank may be provided by connecting the pressure tank to the to the air lines of the tractor.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle roof snow removal system comprising:

a main frame;

a scraper blade assembly coupled to said main frame, said scraper blade assembly having a scraper blade, said scraper blade being lowerable from a top of said main frame such that said scraper blade is adapted for scraping snow from a roof of a vehicle passing through said main frame; and a snow chute coupled to said main frame, said snow chute being positioned to direct snow scraped by said scraping blade away from said main frame while the vehicle passes through said main frame.

2. The vehicle roof snow removal system of claim 1, further comprising:

a snow receiving assembly positioned at a base of said snow chute for receiving snow directed by said chute;

said snow receiving assembly being heated for melting said snow received by said snow receiving assembly; and said snow receiving assembly including a drain for draining said melted snow out of said snow receiving assembly.

3. The vehicle roof snow removal system of claim 1, further comprising:

said snow chute being pivotally coupled to said main frame for pivoting a top of said snow chute towards the vehicle while the vehicle passes through said main frame.

4. The vehicle roof snow removal system of claim 3, further comprising:

a first chute roller coupled to said snow chute, said first chute roller being adapted for rolling against a side of the vehicle as the vehicle passes through said main frame for preventing said top of said snow chute from scraping against the vehicle.

5. The vehicle roof snow removal system of claim 4, further comprising:

a chute piston assembly having a first end pivotally coupled to said snow chute, said chute piston assembly having a second end pivotally coupled to said main frame whereby said snow chute is pivotable towards a center of said scraper blade when said chute piston assembly is extended.

6. The vehicle roof snow removal system of claim 5, further comprising:

a chute piston spring member coupled between said first end and said second end whereby said chute piston assembly is compressible for preventing said snow chute from damaging the vehicle.

7. The vehicle roof snow removal system of claim 4, further comprising:
   a control Unit operationally coupled to said scraper blade assembly for lowering said scraper blade relative to said main frame;
   a main sensor coupled to said main frame for detecting the vehicle passing through said main frame, said main sensor being coupled to said control unit whereby said control unit lowers said scraper blade upon detection of the vehicle passing through said main frame by said main sensor;
   said control unit being operationally coupled to said snow chute for urging a top of said snow chute towards a center of said scraper blade; and
   a chute contact sensor coupled to said top of said snow chute for detecting said first roller contacting the vehicle, said chute contact sensor being coup led to said control unit whereby said control unit ceases pivoting said top of said snow chute upon said chute contact sensor detecting said first roller contacting the vehicle.

8. The vehicle roof snow removal system of claim 1, further comprising:
   said snow chute being coupled to a snow chute frame, said snow chute frame being coupled to said main frame, said snow chute frame being extendable towards a center of said main frame whereby said snow chute is adapted for being positioned adjacent to a side of the vehicle as the vehicle passes through said main frame.

9. The vehicle roof snow removal system of claim 8, further comprising:
   a chute frame roller coupled to said snow chute frame, said chute frame roller being adapted for rolling against a side of the vehicle as the vehicle passes through said main frame for preventing said top of said snow chute from scraping against the vehicle.

10. The vehicle roof snow removal system of claim 9, further comprising:
    a chute control unit operationally coupled to said snow chute frame for extending said snow chute frame;
    a chute sensor coupled to said snow chute frame for detecting when the vehicle passes through said main frame, said chute sensor being operationally coupled to said chute control unit whereby said chute control unit extends said snow chute frame upon said chute sensor detecting the vehicle passing through said main frame.

11. The vehicle roof snow removal system of claim 8, further comprising:
    a chute frame rod assembly having a first end coupled to said snow chute frame, said chute frame rod assembly having a second end slidably coupled to said main frame for extending said snow chute frame from said main frame;
    said chute frame rod assembly having a plurality of teeth extending proximate said second end of said chute frame rod assembly; and
    a frame drive gear coupled to said main frame and engaging said plurality of teeth for selectively extending and retracting said snow chute frame when said drive gear is rotated.

12. The vehicle roof snow removal system of claim 11, further comprising:
    said chute frame rod assembly including a chute frame spring member coupled between said first end and said second end of said chute frame rod assembly whereby said chute frame assembly is compressible for preventing said snow chute from damaging the vehicle when said snow chute frame is extended.

13. The vehicle roof snow removal system of claim 12, further comprising:
    a chute control unit operationally coupled to said snow chute frame for extending said snow chute frame;
    a chute sensor coupled to said snow chute frame for detecting when said vehicle passes through said main frame, said chute sensor being operationally coupled to said chute control unit whereby said chute control unit rotates said chute drive gear to extend said snow chute frame upon said chute sensor detecting the vehicle passing through said main frame.

14. The vehicle roof snow removal system of claim 1, further comprising:
    said snow chute being slidably coupled to said main frame for sliding a top of said snow chute towards the vehicle while the vehicle passes through said main frame.

15. A vehicle roof snow removal system comprising:
    a main frame;
    a scraper blade assembly coupled to said main frame, said scraper blade assembly having a scraper blade, said scraper blade being lowerable from a top of said main frame such that said scraper blade is adapted for scraping snow from a roof of a vehicle passing through said main frame; and
    a scraper roller coupled to said scraper blade assembly, said scraper roller being adapted for rolling against the roof of the vehicle for preventing said scraper blade assembly from damaging the roof of the vehicle.

16. The vehicle roof snow removal system of claim 15, further comprising:
    a second chute roller coupled to a top of said snow chute, said second roller contacting a distal portion of said scraper blade assembly for urging said top of said snow chute towards a center of said scraper blade assembly when said scraper blade assembly is lowered relative to said top of said main frame.

17. A vehicle roof snow removal system comprising:
    a main frame;
    a scraper blade assembly coupled to said main frame, said scraper blade assembly having a scraper blade, said scraper blade being lowerable from a top of said main frame such that said scraper blade is adapted for scraping snow from a roof of a vehicle passing through said main frame; and
    a pair of spaced guides adapted for engaging the vehicle, said guides being aligned with said main frame such that said guides align the vehicle with said main frame whereby the vehicle passes through said main frame as the vehicle is moved forwardly while engaged to said guides.

18. A vehicle roof snow removal system comprising:
    a main frame;
    a scraper blade assembly coupled to said main frame, said scraper blade assembly having a scraper blade, said scraper blade being lowerable from a top of said main frame such that said scraper blade is adapted for scraping snow from a roof of a vehicle passing through said main frame;
    a control unit operationally coupled to said scraper blade assembly for lowering said scraper blade relative to said main frame; and
    a main sensor coupled to said main frame for detecting the vehicle passing through said main frame, said main sensor being coupled to said control unit whereby said control unit lowers said scraper blade upon detection of the vehicle passing through said main frame by said main sensor.

19. A vehicle roof snow removal system comprising:

a main frame;

a scraper blade assembly coupled to said main frame, said scraper blade assembly having a scraper blade, said scraper blade being lowerable from a top of said main frame such that said scraper blade is adapted for scraping snow from a roof of a vehicle passing through said main frame;

said scraper blade assembly including a scraper frame coupled to said scraper blade, said scraper frame having a pair of connection portions, each connection portion extending from an associated side of said scraper frame;

said main frame including a pair of side housings, each side housing having a mounting slot;

a pair of mounting brackets, each mounting bracket being slidably positioned within an associated one of said side housings of said main frame and extending outwardly from said associated side housing through said associated mounting slot; and each said connection portion of said scraper frame being coupled to an associated one of said mounting brackets whereby said scraper assembly is slidably mounted to said main frame.

20. The vehicle roof snow removal system of claim 19, further comprising:

each said side housing having a central post;

pair of first collars, each said first collar being coupled to an associated one of said central posts;

each said mounting bracket being coupled to an associated one of said first collars;

a pair of second collars, each said second collar being slidably coupled to an associated one of said central posts, each second collar being positioned adjacent an associated one of said first collars;

a pair of spring members, each spring member being coupled between an associated first collar and said associated second collar for biasing said associated first and second collars towards each other on said associated central post; and a pair of counterweight assemblies, each counterweight assembly being coupled to an associated second collar.

21. The vehicle roof snow removal system of claim 20, further comprising:

a handle extending from one of said side housings, a medial portion of said handle being pivotally coupled within said housing such that an interior end of said handle is movable when an exterior end of said handle is manipulated by a user; and a cable assembly coupling said interior end of said handle to each of said mounting brackets such that manipulation of said exterior end of said handle selectively lowers and elevates said scraper blade assembly.

22. The vehicle roof snow removal system of claim 21, further comprising:

said main frame including an upper housing extending between upper ends of said side housings;

said cable assembly including a cable junction, a plurality of pulleys, and three cables;

a first one of said cables extending between said interior end of said handle and said cable junction;

a second one of said cables extending through a first one of said pulleys, said second cable being coupled to a first one of said mounting brackets; and a third one of said cables extending through a second one of said pulleys, said upper housing, and a third one of said pulleys, said third cable being coupled to a second one of said mounting brackets.

23. The vehicle roof snow removal system of claim 20, further comprising:

a pair of drive gears, each drive gear being positioned in an associated one of said side housings;

each second collar including an associated set of teeth; and each drive gear being engaged to said associated set of teeth of an associated second collar whereby rotating said drive gear slides said associated second collar on said associated central post.

24. The vehicle roof snow removal system of claim 23, further comprising:

a control unit operationally coupled to said scraper blade assembly for lowering said scraper blade relative to said main frame;

a main sensor coupled to said main frame for detecting the vehicle passing through said main frame, said main sensor being coupled to said control unit; and each said drive gear being operationally coupled to said control unit whereby each said drive gear is actuatable by said control unit upon detection of the vehicle passing through said main frame by said main sensor whereby said scraper blade is lowered upon detection of the vehicle passing through said main frame by said main sensor.

25. The vehicle roof snow removal system of claim 20, further comprising:

a pair of piston assemblies, each piston assembly being positioned in an associated one of said side housings, each piston assembly being coupled to an associated one of said second collars whereby extension of said each piston assembly slides said associated second collar on said associated central post.

26. The vehicle root snow removal system of claim 25, further comprising:

a control unit operationally coupled to said scraper blade assembly for lowering said scraper blade relative to said main frame;

a main sensor coupled to said main frame for detecting the vehicle passing through said main frame, said main sensor being coupled to said control unit; and each said piston assembly being operationally coupled to said control unit whereby each said piston assembly is actuatable by said control unit upon detection of the vehicle passing through said main frame by said main sensor whereby said scraper blade is lowered upon detection of the vehicle passing through said main frame by said main sensor.

27. A vehicle roof snow removal system comprising:

a main frame;

a scraper blade assembly coupled to said main frame, said scraper blade assembly having a scraper blade, said scraper blade being lowerable from a top of said main frame such that said scraper blade is adapted for scraping snow from a roof of a vehicle passing through said main frame; and a solution dispensing assembly coupled to said main frame, said solution dispensing assembly being adapted for spraying a solution on the roof of the vehicle after said scraper blade scrapes snow from the roof of the vehicle.

28. The vehicle roof snow removal system of claim 27, further comprising:
said solution dispensing assembly including a sprayer housing having a plurality of spaced nozzles, each of said nozzles being positioned for directing said solution downwardly onto the roof of the vehicle as the vehicle passes through the main frame.

29. The vehicle roof snow removal system of claim 28, further comprising:
said solution dispensing assembly including a solution tank for holding a supply of said solution;
a dispensing tube coupled between said solution tank and said sprayer housing for delivering said solution from said solution tank to said sprayer housing for dispensing said solution through said nozzles.

30. The vehicle roof snow removal system of claim 27, further comprising:
said solution including a deicer for removing ice from the roof of the vehicle.

31. The vehicle roof snow removal system of claim 27, further comprising:
said solution including a cleaner for removing dirt from the roof of the vehicle.

32. A vehicle roof snow removal system comprising:
a main frame;
a scraper blade assembly coupled to said main frame, said scraper blade assembly having a scraper blade, said scraper blade being lowerable from a top of said main frame such that said scraper blade is adapted for scraping snow from a roof of a vehicle passing through said main frame;
a squeegee assembly coupled to said scraper blade assembly, such that a lower edge of a squeegee blade contacts the roof of the vehicle when said scraper blade assembly is in a lowered position whereby said squeegee blade is adapted for scraping water from the roof of the vehicle as the vehicle passes through said main frame;
a pair of snow chutes, each snow chute being coupled to an associated side of said main frame, each said snow chute being positioned to direct snow scraped by said scraping blade away from said main frame while the vehicle passes through said main frame;
a pair of snow receiving assemblies, each snow receiving assembly being positioned at a base of an associated one of said snow chutes for receiving snow directed by said associated snow chute;
each said snow receiving assembly being heated for melting said snow received by said snow receiving assembly;
each said snow receiving assembly including a drain for draining said melted snow out of said snow receiving assembly;
each said snow chute being pivotally coupled to said associated side of said main frame for pivoting a respective top of each said snow chute towards the vehicle while the vehicle passes through said main frame;
a pair of first chute rollers, each first chute roller being coupled to an associated one of said snow chutes, each said first chute roller being adapted for rolling against an associated side of the vehicle as the vehicle passes through said main frame for preventing said top of said associated snow chute from scraping against the vehicle;
a scraper roller coupled to said scraper blade assembly said scraper roller being adapted for rolling against the roof of the vehicle for preventing said scraper blade assembly from damaging the roof of the vehicle;
a pair of spaced guides adapted for engaging the vehicle, said guides being aligned with said main frame such that said guides align the vehicle with said main frame whereby the vehicle passes through said main frame as the vehicle is moved forwardly while engaged to said guides;
each of said spaced guides having an arcuate end portion positioned such that said a space between said spaced guides narrows approaching said main frame for facilitating aligning the vehicle for passing through said main frame;
a control unit operationally coupled to said scraper blade assembly for lowering said scraper blade relative to said main frame;
a main sensor coupled to said main frame for detecting the vehicle passing through said main frame, said main sensor being coupled to said control unit whereby said control unit lowers said scraper blade upon detection of the vehicle passing through said main frame by said main sensor;
said control unit being operationally coupled to said snow chute for pivoting a top of said snow chute towards a center of said scraper blade;
a pair of chute contact sensors, each chute contact sensor being coupled to said top of an associated one of said snow chutes for detecting said first roller contacting the vehicle; each said chute contact sensor being coupled to said control unit whereby said control unit ceases pivoting said top of said associated snow chute upon said chute contact sensor detecting said first roller contacting the vehicle;
said scraper blade assembly including a scraper frame coupled to said scraper blade, said scraper frame having a pair of connection portions, each connection portion extending from an associated side of said scraper frame;
said main frame including a pair of side housings, each side housing having a mounting slot;
a pair of mounting brackets, each mounting bracket being slidably positioned within an associated one of said side housings of said main frame and extending outwardly from said associated side housing through said associated mounting slot;
each said connection portion of said scraper frame being coupled to an associated one of said mounting brackets whereby said scraper assembly is slidably mounted to said main frame;
a deicing assembly coupled to said main frame, said deicing assembly being adapted for spraying a deicer on the roof of the vehicle after said scraper blade scrapes snow from the roof of the vehicle;
said deicing assembly including a sprayer housing having a plurality of spaced nozzles, each of said nozzles being positioned for directing said deicer downwardly onto the roof of the vehicle as the vehicle passes through the main frame;
said deicing assembly including a deicer tank for holding a supply of said deicer;

a dispensing tube coupled between said deicer tank and said sprayer housing for delivering said deicer from said deicer tank to said sprayer housing for dispensing said deicer through said nozzles;

each said side housing having a central post;

a pair of first collars, each said first collar being coupled to an associated one of said central posts;

each said mounting bracket being coupled to an associated one of said first collars;

a pair of second collars, each said second collar being slidably coupled to an associated one of said central posts, each second collar being positioned adjacent an associated one of said first collars;

a pair of spring members, each spring member being coupled between an associated first collar and said associated second collar for biasing said associated first and second collars towards each other on said associated central post;

a pair of counterweight assemblies, each counterweight assembly being coupled to an associated second collar;

a pair of piston assemblies, each piston assembly being positioned in an associated one of said side housings, each piston assembly being coupled to an associated one of said second collars whereby extension of said each piston assembly slides said associated second collar on said associated central post;

each said piston assembly being operationally coupled to said control unit whereby each said piston assembly is actuatable by said control unit upon detection of the vehicle passing through said main frame by said main sensor whereby said scraper blade is lowered upon detection of the vehicle passing through said main frame by said main sensor;

a pair of chute piston assemblies, each chute piston assembly having a first end pivotally coupled to an associated one of said snow chutes, each said chute piston assembly having a second end pivotally coupled to said main frame whereby each said snow chute is pivotable towards a center of said scraper blade when said associated chute piston assembly is extended; and a pair of chute piston spring members, each chute piston spring member being coupled between said first end and said second end of an associated one of said chute piston assemblies whereby each said chute piston assembly is compressible for preventing said snow chute from damaging the vehicle.

33. A vehicle roof snow removal system comprising:

a main frame;

a scraper blade assembly coupled to said main frame, said scraper blade assembly having a scraper blade, said scraper blade being lowerable from a top of said main frame such that said scraper blade is adapted for scraping snow from a roof of a vehicle passing through said main frame; and a squeegee assembly coupled to said scraper blade assembly, such that a lower edge of a squeegee blade contacts the roof of the vehicle when said scraper blade assembly is in a lowered position whereby said squeegee blade is adapted for scraping water from the roof of the vehicle as the vehicle passes through said main frame.

* * * * *